(12) United States Patent
Stocker

(10) Patent No.: US 11,788,744 B2
(45) Date of Patent: Oct. 17, 2023

(54) VENTILATION SYSTEMS

(71) Applicant: Solar Royal, LLC, Austin, TX (US)

(72) Inventor: Roy R. Stocker, Austin, TX (US)

(73) Assignee: Solar Royal, LLC, Austin, TX (US)

( * ) Notice: Subject to any disclaimer, the term of this patent is extended or adjusted under 35 U.S.C. 154(b) by 583 days.

(21) Appl. No.: 17/018,076

(22) Filed: Sep. 11, 2020

(65) Prior Publication Data
US 2021/0048205 A1     Feb. 18, 2021

Related U.S. Application Data

(63) Continuation-in-part of application No. 14/329,596, filed on Jul. 11, 2014, now abandoned, which is a
(Continued)

(51) Int. Cl.
*F24F 7/02* (2006.01)
*F24F 7/06* (2006.01)
(Continued)

(52) U.S. Cl.
CPC .............. *F24F 7/025* (2013.01); *F16L 37/24* (2013.01); *F16L 37/244* (2013.01); *F24F 7/065* (2013.01);
(Continued)

(58) Field of Classification Search
CPC ......... F16L 37/12; F16L 37/24; F16L 37/113; F16L 37/107; F16L 37/252; F24F 7/025;
(Continued)

(56) References Cited

U.S. PATENT DOCUMENTS 2,875,678 A    3/1959   Shepherd
2,900,892 A *  8/1959   Shepherd .............. F04D 29/646
                                                454/355
(Continued)

FOREIGN PATENT DOCUMENTS

CA      2388527 C  * 10/2008  ........... F04D 25/166
CH     689236 A5  * 12/1998  ........... F16L 33/225
(Continued)

OTHER PUBLICATIONS

Cameo Refrigerator Roof Vent, Apr. 14, 2010. https://www.youtube.com/watch?v=J-WrQKU7850. Please refer to images of the video provided as non-patent literature (Cameo Apr. 14, 2010.pdf) (Year: 2010).

*Primary Examiner* — Edelmira Bosques
*Assistant Examiner* — Frances F. Hamilton

(57) ABSTRACT

Ventilation systems are disclosed that include a base unit having a mounting platform connecting the base unit to a surface. Such base units have a base collar that extends away from the mounting platform and forms a perimeter of a opening through the base unit. Such ventilation systems include a fan unit that has a fan housing and a fan. The fan housing is configured to receive air through an inlet and expel air through an outlet, and the fan is capable of moving air from the inlet to the outlet. Such ventilation systems also include a quick connect interface that has a base feature and a fan housing feature. The base feature is integrated into the base unit, and the fan housing feature integrated into the fan unit; both are capable of detachably connecting together to secure the fan unit to the base unit.

15 Claims, 18 Drawing Sheets

Related U.S. Application Data continuation-in-part of application No. 29/422,087, filed on May 16, 2012, now Pat. No. Des. 762,835.

(60) Provisional application No. 61/879,439, filed on Sep. 18, 2013.

(51) Int. Cl.
*F16L 37/24* (2006.01)
*F16L 37/244* (2006.01)
*F16L 37/252* (2006.01)
*F24F 13/02* (2006.01)
F16L 37/107 (2006.01)
F16L 37/10 (2006.01)
F24F 5/00 (2006.01)
F16L 37/12 (2006.01)

(52) U.S. Cl.
CPC ......... *F24F 13/0209* (2013.01); *F16L 37/105* (2013.01); *F16L 37/107* (2013.01); *F16L 37/12* (2013.01); *F16L 37/252* (2013.01); *F24F 2005/0067* (2013.01)

(58) Field of Classification Search
CPC ........ F24F 7/065; F24F 13/0209; F24F 13/32; F24F 2221/16; F24F 2005/0064; F24F 5/0046; F24F 2005/0067
USPC .................................. 454/338, 900
See application file for complete search history.

(56) References Cited

U.S. PATENT DOCUMENTS

| | | | |
|---|---|---|---|
| 2,980,008 A | 4/1961 | Akehurst | |
| 2,988,981 A * | 6/1961 | Jenn | F24F 7/025 |
| | | | 454/356 |
| 3,016,003 A * | 1/1962 | Jenn | F24F 7/025 |
| | | | 454/355 |
| 3,080,633 A | 3/1963 | Reddy | |
| 3,082,677 A | 3/1963 | Pease | |
| 3,093,059 A | 6/1963 | Metz | |
| 3,237,904 A | 3/1966 | Abruzese | |
| 3,302,551 A | 2/1967 | Belle et al. | |
| 3,595,201 A | 7/1971 | Oudenhoven | |
| 3,596,936 A * | 8/1971 | Dieckmann | F16L 59/18 |
| | | | 285/423 |
| 3,715,967 A | 2/1973 | Field | |
| 3,934,383 A | 1/1976 | Perry et al. | |
| 3,952,638 A | 4/1976 | Felter et al. | |
| 3,960,063 A | 6/1976 | Siemes et al. | |
| 4,099,747 A * | 7/1978 | Meserole | F16L 59/188 |
| | | | 285/47 |
| 4,297,818 A | 11/1981 | Anderson | |
| D262,457 S | 12/1981 | Swales | |
| 4,470,623 A | 9/1984 | Judge, Jr. | |
| D282,972 S | 3/1986 | Castor et al. | |
| 4,633,769 A | 1/1987 | Milks | |
| 4,759,270 A | 7/1988 | Lindeen | |
| 5,038,674 A | 8/1991 | Merges | |
| 5,185,941 A | 2/1993 | Dongelmans | |
| 5,188,333 A * | 2/1993 | Schumacher | F24F 13/32 |
| | | | 248/676 |
| 5,328,405 A | 7/1994 | Jarnot | |
| 5,409,266 A | 4/1995 | Baker | |
| D360,028 S | 7/1995 | Matsuda | |
| 5,461,880 A * | 10/1995 | Bolton | F24F 13/20 |
| | | | 62/262 |
| 5,465,533 A * | 11/1995 | Rummo, Jr. | F24F 13/32 |
| | | | 52/285.3 |
| 5,651,732 A * | 7/1997 | Dufour | F23J 13/04 |
| | | | 126/307 R |
| 5,662,522 A | 9/1997 | Waltz | |
| 5,672,101 A | 9/1997 | Thomas | |
| D391,632 S | 3/1998 | Thomas | |
| 5,732,867 A | 3/1998 | Perkins et al. | |
| 5,816,909 A | 10/1998 | Wunder | |
| D418,839 S | 1/2000 | Brunner et al. | |
| 6,102,794 A | 8/2000 | Cline | |
| 6,152,817 A | 11/2000 | Daniels et al. | |
| D439,008 S | 3/2001 | Kim | |
| 6,293,862 B1 | 9/2001 | Jafine et al. | |
| 6,302,787 B1 | 10/2001 | Graft, Jr. | |
| 6,353,978 B1 | 3/2002 | Kawahara et al. | |
| D470,482 S | 2/2003 | Eiji | |
| 6,520,852 B2 | 2/2003 | Mckee et al. | |
| D481,822 S | 11/2003 | Wang | |
| D484,228 S | 12/2003 | Zhang et al. | |
| 6,902,211 B2 * | 6/2005 | Wirth, Jr. | A47L 9/242 |
| | | | 285/402 |
| 6,932,690 B2 | 8/2005 | Ramsay | |
| D533,956 S | 12/2006 | Vladika | |
| D535,434 S | 1/2007 | Fischer et al. | |
| 7,166,023 B2 | 1/2007 | Haigh et al. | |
| D550,660 S | 9/2007 | Noro et al. | |
| D566,262 S | 4/2008 | Zakula et al. | |
| D567,354 S | 4/2008 | Jacak et al. | |
| D567,355 S | 4/2008 | Zakula et al. | |
| D567,931 S | 4/2008 | Hollingsworth et al. | |
| D567,932 S | 4/2008 | Hollingsworth et al. | |
| D567,933 S | 4/2008 | Hollingsworth et al. | |
| D568,460 S | 5/2008 | Jacak et al. | |
| D569,492 S | 5/2008 | Zakula et al. | |
| D574,479 S | 8/2008 | Brockington et al. | |
| D579,799 S | 11/2008 | Barton et al. | |
| 7,566,079 B1 * | 7/2009 | Callahan | F16L 37/113 |
| | | | 285/314 |
| 7,677,964 B1 | 3/2010 | Bucher et al. | |
| 7,780,510 B2 | 8/2010 | Polston | |
| D625,721 S | 10/2010 | Erber et al. | |
| D626,644 S | 11/2010 | Jacak et al. | |
| 7,882,670 B2 | 2/2011 | West | |
| D656,660 S | 3/2012 | Henderson et al. | |
| 8,128,465 B2 | 3/2012 | Collins | |
| 8,181,403 B1 | 5/2012 | Polston | |
| 8,209,923 B1 | 7/2012 | Rich | |
| 8,240,093 B2 | 8/2012 | Lajewski | |
| D666,707 S | 9/2012 | Eikhoff et al. | |
| D668,375 S | 10/2012 | Daniels | |
| 8,535,128 B2 | 9/2013 | Chwala | |
| D693,952 S | 11/2013 | Soni | |
| D698,980 S | 2/2014 | Yu | |
| 8,661,753 B2 | 3/2014 | Lenox | |
| 8,898,864 B1 | 12/2014 | Porter | |
| 9,217,581 B1 * | 12/2015 | Merideth | F24F 13/32 |
| 9,266,405 B1 | 2/2016 | Blanchard | |
| 9,435,556 B1 | 9/2016 | Chwala | |
| 9,494,330 B2 | 11/2016 | Bushey | |
| 9,513,022 B2 * | 12/2016 | Zhong | F24F 7/013 |
| 10,859,194 B2 * | 12/2020 | French | F16L 37/098 |
| 11,609,003 B1 * | 3/2023 | White | F16L 37/105 |
| 2003/0054754 A1 | 3/2003 | H. A. McKee | |
| 2005/0003755 A1 | 1/2005 | Koessler | |
| 2006/0025067 A1 | 2/2006 | Koessler | |
| 2007/0068984 A1 | 3/2007 | Leitner et al. | |
| 2007/0173191 A1 | 7/2007 | Daniels et al. | |
| 2008/0093843 A1 * | 4/2008 | Noroozi | F16L 41/08 |
| | | | 285/81 |
| 2008/0295279 A1 * | 12/2008 | Alamond | F16L 37/252 |
| | | | 15/330 |
| 2009/0023377 A1 | 1/2009 | Duke et al. | |
| 2009/0162188 A1 | 6/2009 | Milks | |
| 2010/0257798 A1 | 10/2010 | Ward | |
| 2010/0304660 A1 * | 12/2010 | Boehling | H01L 31/042 |
| | | | 454/343 |
| 2010/0330898 A1 | 12/2010 | Daniels | |
| 2011/0219953 A1 * | 9/2011 | Schreiber | F24F 8/108 |
| | | | 55/385.2 |
| 2011/0237177 A1 | 9/2011 | Stewart et al. | |
| 2012/0178357 A1 | 7/2012 | Rheaume | |
| 2012/0302154 A1 * | 11/2012 | Bushey | F24S 25/10 |
| | | | 454/343 |
| 2013/0023200 A1 | 1/2013 | Lepage | |

(56) References Cited

U.S. PATENT DOCUMENTS

| | | | |
|---|---|---|---|
| 2013/0074428 A1 | 3/2013 | Allen et al. | |
| 2013/0149104 A1 | 6/2013 | Chang et al. | |
| 2013/0295836 A1 | 11/2013 | Shannon, III | |
| 2014/0106661 A1 | 4/2014 | Baldwin et al. | |
| 2014/0265303 A1* | 9/2014 | Ismert | F16L 37/123 |
| | | | 285/12 |
| 2015/0079896 A1 | 3/2015 | Stocker | |
| 2015/0087216 A1 | 3/2015 | Stover et al. | |
| 2015/0253021 A1 | 9/2015 | Daniels | |
| 2016/0221418 A1 | 8/2016 | Stover et al. | |
| 2016/0252263 A1* | 9/2016 | Chwala | F24F 7/02 |
| | | | 454/354 |
| 2019/0368966 A1* | 12/2019 | Mizrahi | F24F 13/084 |
| 2020/0284470 A1* | 9/2020 | Vernekar | F16M 7/00 |
| 2021/0140675 A1* | 5/2021 | Hess | F24F 13/10 |
| 2023/0003416 A1* | 1/2023 | White | F24F 13/0263 |

FOREIGN PATENT DOCUMENTS

| | | | | |
|---|---|---|---|---|
| DE | 4236674 A1 | * | 5/1994 | B60H 1/00471 |
| FR | 2874996 A1 | * | 3/2006 | F24F 1/0007 |
| GB | 1270228 | * | 4/1972 | F16L 37/24 |
| JP | 06-241517 A | | 8/1994 | |
| JP | H10288391 A | * | 10/1998 | F24F 13/02 |

\* cited by examiner

VENTILATION SYSTEMS

CROSS REFERENCE TO RELATED APPLICATIONS

This application is a continuation-in-part of, and claims the benefit of, U.S. non-provisional patent application Ser. No. 14/329,596 filed on Jul. 11, 2014, which claims the benefit of U.S. provisional patent application No. 61/879,439 filed on Sep. 18, 2013 and which is a continuation-in-part of U.S. application Ser. No. 29/422,087 filed on May 16, 2012; the disclosures of which are hereby incorporated by reference in their entirety as though the same were reproduced herein verbatim.

BACKGROUND OF THE INVENTION

Many workers are injured every year while installing ventilation fans on residential, commercial, industrial, agricultural, and other types of buildings, utility applications, etc. Take for instance the situation of installing a fan system on a typical residential roof. These roofs, of course, are elevated necessitating the use of ladders, scaffolding, etc. to reach the worksite. Thus, frequently, the worker must stand on a ladder while installing the fan system. These fan systems (and associated hardware such as housings, flashing, etc.) often weigh quite a bit and are bulky and awkward to work with. Maneuvering these items while perched on a ladder, necessarily, increases the strain on the worker and the risk of falling (and other injuries) to which they are exposed. Angled roofs of various pitches aggravate these risks.

Moreover, to install a fan system on a typical roof, the worker must carry the fan system aloft on the ladder, position the fan system with its flashing under the shingles, felt paper, tar paper, slate, metal sheeting, etc. on the roof and then fasten the fan system to the roof. Of course, some roofing materials cannot so easily be "lifted." For instance, some roofs include a layer of tar applied directly to the roof deck. While installing the fan system, the worker often finds it difficult (if not impossible) to see around the fan system and verify its positioning and that the flashing is underneath the roofing materials. As a result, these fan systems are often installed incorrectly resulting in an un-professional appearance fan system and leaks of water (for instance, rain) in the proximity of the fan system.

Additionally, fan systems require power to operate and power might/might not be available in close proximity to the location for particular roof mounted fan systems. Thus, wires, cables, conduits, etc. must be run to the fan and connected thereto. These activities complicate the installation, increase the cost thereof, and increase the number of technicians, workmen, crafts, etc. involved. In such situations, it might be desirable to use solar power to drive these fan systems. However, solar panels can be eye sores, take up space on the roof, etc.

Yet, building owners (and/or other interested parties) still desire the benefits associated with such fan systems (such as improved ventilation). For instance, if functional, these fan systems can ventilate the attics and/or other crawl ways underneath the roof. In turn, the ventilation decreases the temperature of these spaces thereby reducing air conditioning loads of the buildings.

SUMMARY

The following presents a simplified summary in order to provide an understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed disclosure that is presented herein.

Exemplary ventilation systems according to embodiments of the present invention include a base unit that has a mounting platform for connecting the base unit to a surface having a surface opening. The base unit has a base collar extending away from the mounting platform and forming a perimeter of a base opening through the base unit that corresponds to the surface opening.

Exemplary ventilation systems according to embodiments of the present invention also include a fan unit. The fan unit includes a fan housing and a fan. This fan housing is configured to receive air through an inlet and expel the air through an outlet. The fan is capable of connecting to a power source that enables the fan to move the air from the inlet to the outlet.

Such ventilation systems according to embodiments of the present invention also include a quick connect interface having a base feature and a fan housing feature. The base feature is integrated into the base unit. The fan housing feature is integrated into the fan unit. The base feature and the fan housing feature are capable of detachably connecting together to secure the fan unit to the base unit.

In some embodiments of ventilation systems according to the present invention, the base feature is mounted to the base collar. The base collar may include a flange around the base collar at an opposite end of the base collar from the mounting platform, and in such examples, the base feature may be mounted to the flange. In some embodiments, the base feature is implemented as a detent extending from the base collar away from the mounting platform. Such a detent may have a detent body and a detent head where the detent head being larger than the detent body.

In some exemplary ventilation systems according to the present invention, the fan housing includes a fan housing base, and the fan housing feature of the quick connect interface is integrated into the fan housing base. The fan housing feature of the quick connect interface may include a receptacle capable of receiving the base feature of the quick connect interface. The receptacle may define an entry region, a transition region, and a locking region. The entry region is capable of receiving the base feature. The transition region is capable of guiding the base feature from entry region to the locking region. The locking region is capable of securing the base feature in the receptacle. In such examples, the transition region includes an incline that guides the base feature into the locking region, and the incline is oriented to pull the base unit and the fan unit together as the base feature moves into the locked region. The fan housing feature of the quick connect interface includes a catch configured to prevent the base feature from backing out of the locking region after passing a predetermined position.

In some embodiments, the fan unit includes one or more solar cells mounted on top of the fan housing and electrically connected to the fan, and the power source includes a solar power source. The fan housing includes a housing bottom, and the fan housing feature is integrated in the housing bottom.

The base collar of exemplary ventilation systems according to embodiments of the present invention may include a detachable riser. The base feature of some of those exemplary ventilation systems may be mounted to the detachable riser.

In other embodiments, the fan housing may include an airflow diverter for guiding the air from the inlet to the outlet. Such an airflow diverter may be configured to be ovoidal in shape. The airflow diverter may include an inner region and an outer region. The inner region is configured adjacent to the inlet, and the outer region is configured adjacent to the outlet. Such airflow diverter may also include one or more vanes for directing the air from the inlet to the outlet.

BRIEF DESCRIPTION OF THE DRAWINGS

The detailed description is described with reference to the accompanying figures.

DETAILED DESCRIPTION

Figure 1:
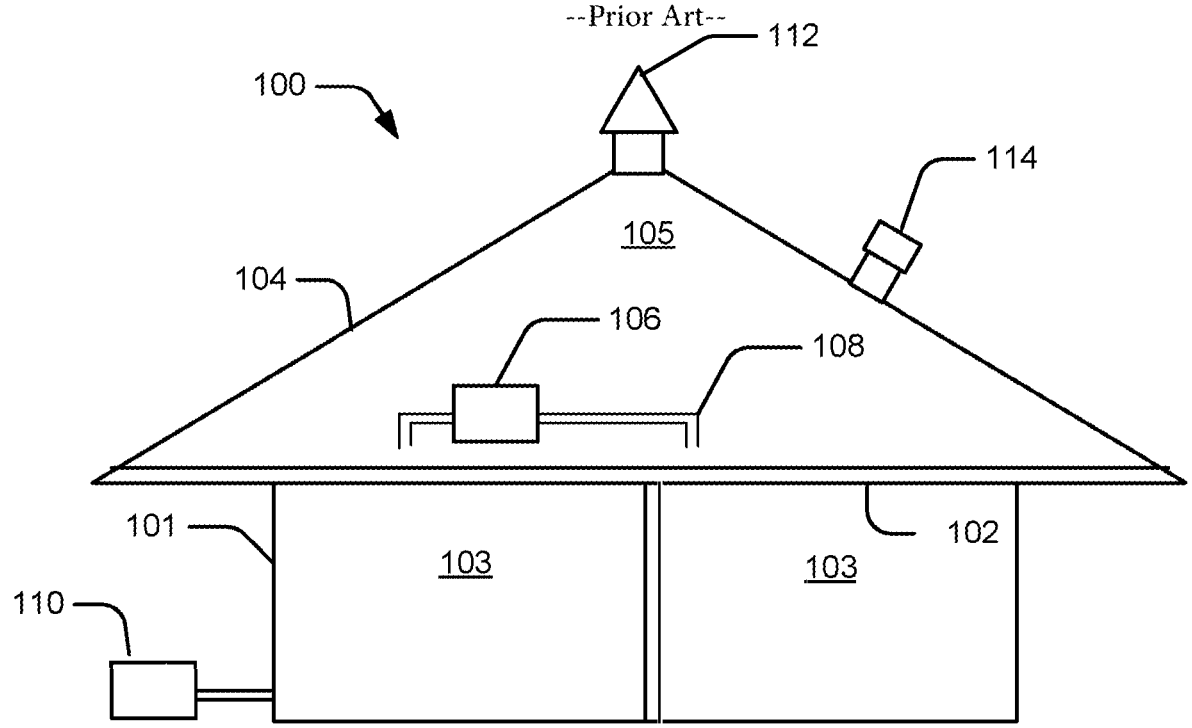
FIG. 1 Prior Art illustrates a building.

The current disclosure provides exemplary ventilation systems, apparatus, methods, etc. for ventilating attics (and/or other spaces) and, more a particularly, multi-piece ventilations units with adjustable (and flush fitting) solar panels and/or quick attachment fittings whereby fan assemblies of the ventilation units can be quickly attached to/detached from bases of ventilation units.

Exemplary embodiments provide two-piece fan systems for use in ventilating spaces such as attics, crawlways, etc. These fan systems can require relatively low power and can possess high reliability. Moreover, fan systems of exemplary embodiments can be powered via solar panels, solar systems, etc. and/or power systems available in the buildings in/on which they might be installed. Fan systems of exemplary embodiments can be used in residential, commercial and/or utility applications, can be thermostat controlled, and whole ventilation system can be windstorm certified per ASTM-E330 (and/or in accordance with other techniques).

Exemplary ventilation systems according to these embodiments are technologically, functionally and aesthetically superior to heretofore-available fan systems. Such exemplary ventilation systems are rugged, durable, practical, windstorm certified and relatively inexpensive to manufacture, install, operate, maintain, modify, etc. Exemplary ventilation systems according to embodiments of the present invention possess elegant low profiles, blend nicely into their environments, and can be painted to match/complement their surroundings. In addition, or in the alternative, such exemplary ventilation systems possess adjustable solar panels. Such fan systems can include adjustable brackets with multiple locking states which support the solar panels and allow their positions to be adjusted.

Exemplary ventilation systems according to embodiments of the present invention can be used to provide proper ventilation for many spaces. In some situations, these fan systems ventilate spaces to reduce temperatures inside enclosed spaces throughout the year such as attics, crawl spaces, warehouses, storage areas, sheds, barns, etc. In the summer, in particular, solar powered attic fan systems of embodiments help make such areas more comfortable by converting passive ventilation to active ventilation.

Exemplary ventilation systems according to embodiments of the present invention can reduce HVAC (heating, ventilation, and air conditioning) costs and reduce cooling cycles thereby saving energy and money. Furthermore, by reducing interior temperatures these exemplary ventilation systems can reduce premature deterioration of shingles, roof boards, sheathing, siding, insulation, stored valuables, etc. Proper ventilation can also prevent/reduce moisture (from relatively warm air) condensing on the under sides of relatively cool roofs, beams, rafters, etc. Moreover, because fan systems of some exemplary embodiments are solar powered, such exemplary embodiments can cost the owner/operator little or nothing to operate. Some exemplary embodiments include solar panels (and their adjustable brackets) to power the fan system, and those solar panels may be embedded in the fan housings rather than appearing as add-ons or appearing as if those panels have been glued onto the ventilation systems.

Some ventilation systems according to embodiments of the present invention provide two-piece ventilation units comprising bottom bases, top housings, solar panels, locks, and biasing members. The bottom bases of such exemplary embodiment may define flashing which is shaped and dimensioned to divert runoff around the fan systems. They also define riser portions extending from the flashing and further define first halves of twist-on, quick attachment couplings. The top housings of the such exemplary embodiments contain fans and define second halves of the twist-on, quick attachment couplings. The top housings are releasably coupled to the bottom bases via the twist-on/off quick attachment couplings. Furthermore, the solar panels couple to the top housings and are pivotable between stowed positions in which the panels lay flush with the top housings and extended positions in which the panels extend at an angle from the top housings. Moreover, the solar panels are in electrical communication with the fans. The locks operatively couple with the bottom bases and the top housings and, when in their locked positions, lock the twist-on, quick attachment couplings in their coupled positions. The biasing members operatively couple with the locks and urge the locks toward their coupled positions.

Still further, various ventilation systems according to embodiments of the present invention provide bases (defining flashing portions) and housings which together define, respectively, first and second halves of quick attachment couplings. The quick attachment couplings allow the housings to be releasably coupled to the bases. In some embodiments, exemplary ventilation systems further comprise solar panels coupled to the housings which are pivotable between stowed positions whereby such panels lay flush with the housings and elevated positions whereby the panels extend from the top of the housing.

If desired, the quick attachment couplings according to exemplary embodiments of the present invention can be twist-on (twist-off) quick attachment couplings. Such exemplary ventilation systems can include locks operatively coupled to the bases and, which when in locked positions, can lock the twist-on, quick attachment couplings in coupled positions. Furthermore, biasing members can operatively couple with the locks and urge the locks toward their locked positions. Some exemplary ventilation systems may include risers that can be adapted to releasable couple between the bases and the housings. In some exemplary embodiments, the flashing portions can be adapted to be mounted on pitched roofs, and the exemplary ventilation systems can include fans contained in the housings. In addition, or in the alternative, exemplary ventilation systems according to embodiments of the present invention may further include electrical connections adapted to receive 120 VAC (volts alternating current).

Some exemplary ventilation systems according to embodiments of the present invention may possess bases and housings which define quick attachment couplings by which the fan housings are releasably coupled to the bases. In the alternative, or in addition, exemplary bases according to embodiments of the present invention may define riser portions extending from the flashings and further defining the quick attachment couplings. The quick attachment couplings can be twist-on quick attachment couplings. Moreover, the quick attachment couplings can be locked and can be biased toward their locked positions.

Turning to FIG. 1, FIG. 1 illustrates a building. More particularly, FIG. 1 illustrates a building 100, walls 101, a ceiling 102, air-conditioned spaces 103, a roof 104, a crawl way 105, HVAC (heating, ventilation, and air-conditioning) equipment 106, ducts 108, an air conditioner (evaporator) 110, a roof vent 112, and an roof-mounted fan system 114. The building 100 could be a residential building (as shown), a commercial building, an industrial building, etc. The building 100 exists in a region in which the sun and other heat sources create a heat load on the building 100. It also exists in an area where neighboring property owners might wish to maintain the aesthetic appearance of the neighborhood. Thus, the owner of the building 100 might wish to manage the heat load of the building 100 while not adversely affecting the aesthetic qualities of the building 100, the neighborhood, etc.

The building 100 also includes a number of walls 101 as well as or, in the alternative to, other structures. Typically, these structures define one or more of the "air-conditioned" spaces 103 and one or more of the crawlways 105. The air-conditioned spaces 103 are said to be "air-conditioned" in the sense that the condition of the air therein might be maintained more or less at some given state and, more specifically, at some desired temperature. Yet the external heat load (from the sun and/or other sources) and, potentially, internal heat loads (for instance, from lighting, electrical/mechanical equipment, occupants, etc.) can affect the temperature of those air-conditioned spaces 103. In many cases, the crawl way 105 (or attic) is included in the design of the building 100 to provide a degree of separation between the air-conditioned spaces 103 and the external environment (and its heat loads). Yet, that crawlway 105 itself can become warm thereby exposing the air-conditioned spaces 103 to heat flux from the crawl way 105 itself and/or reduce the amount of heat which would otherwise escape from the air-conditioned spaces 103 through that space.

Moreover, many building designers, owners, maintenance personnel, etc. are known to place various pieces of equipment in these crawl ways 105. For instance, building designers frequently locate HVAC equipment 106 and associated ducts 108 in these crawl ways 105. Some HVAC equipment 106, of course, represent sources of heat themselves. The ducts 108 often convey air-conditioned air and, even if insulated, allow that air-conditioned air to absorb heat from the air in the crawl way 105. Thus, heat from the HVAC equipment 106 and other heat sources can be conveyed into the air-conditioned spaces 103 via the ducts 108.

The roof 104 along with the ceiling 102 defines the crawl way 105 and tends to trap heat in that crawl way 105. Indeed, warm (or even hot) air in the crawl way 105 can rise to the crown or apex of the roof 104 where it becomes trapped unless vented. As a result, a temperature gradient can exist as sensed at various heights in the crawl way 105 with the hottest air frequently being found near the apex of the roof 104.

In many situations, users might place a roof vent 112 on the roof 104 to vent the crawl way 105. If placed near the apex of the roof 104, the roof vent 112 therefore allows the warmer air in the crawlway 105 to rise through itself and therefore escape from the crawl way 105. However, such passive roof vents 112 rely on natural convection to drive the flow of the warm air and might not therefore be that effective in managing the heat load(s) affecting the crawl way 105 (and/or the air-conditioned spaces 103). Indeed, natural convection typically does not happen in a substantial manner until the crawl way 105 temperature reaches about 136 degrees F. Thus, some users include a roof-mounted fan system 114 on the roof 104 to actively ventilate the crawl way 105.

Figure 2:
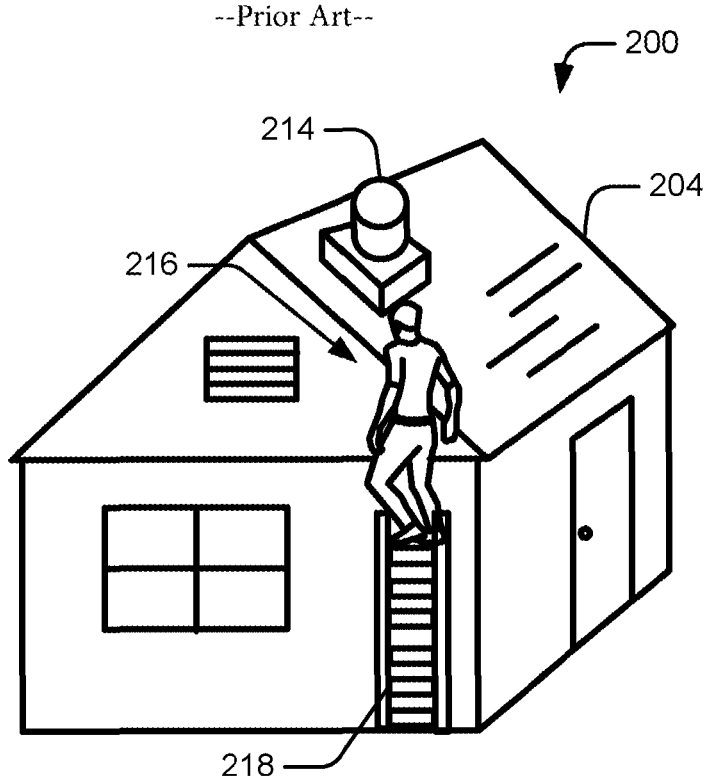
FIG. 2 Prior Art illustrates a user installing a roof-mounted fan system.
Figure 3:
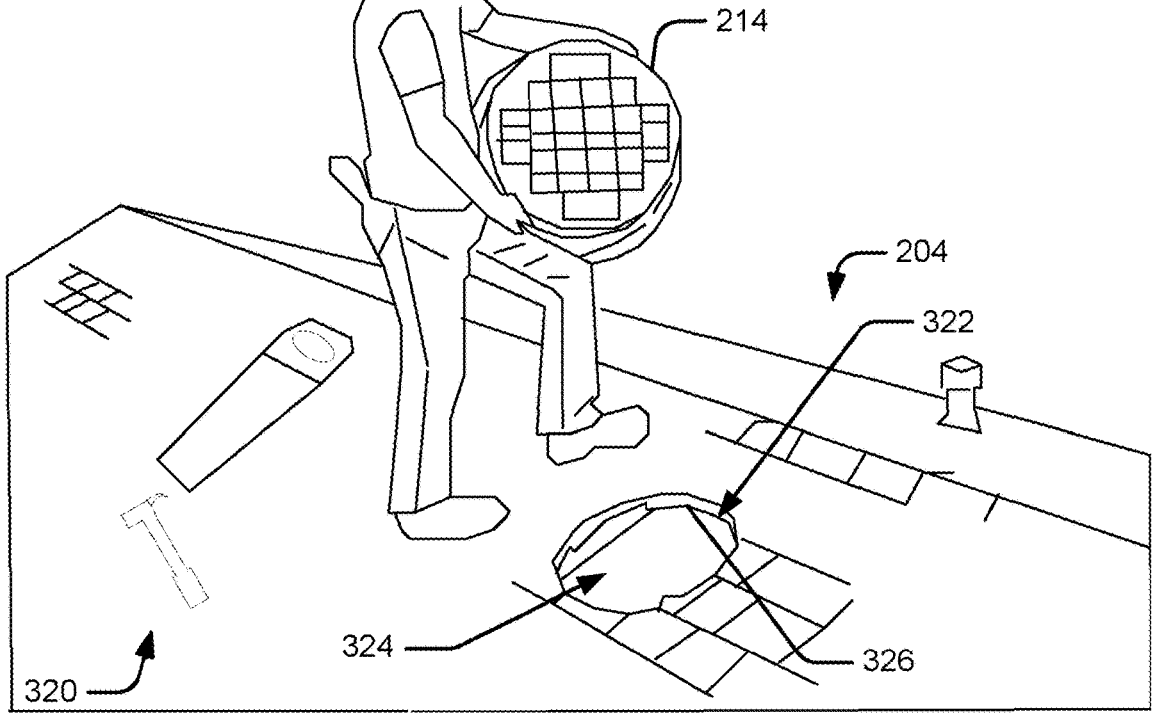
FIG. 3 Prior Art further illustrates a user installing a roof-mounted fan system.
Figure 4:
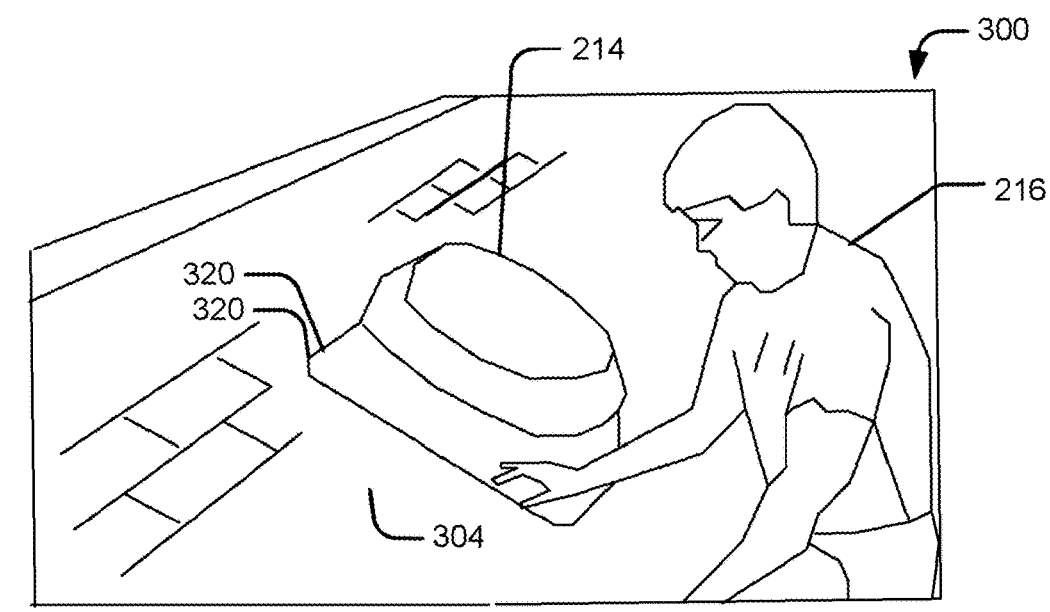
FIG. 4 Prior Art still further illustrates a user installing a roof-mounted fan system.

Such active ventilation equipment such as a roof-mounted fan system 214, though comes with certain drawbacks. For one thing, heretofore-available roof-mounted fan systems 114 are bulky, awkward, and heavy and therefore difficult to install as FIGS. 2-4 illustrate. More particularly, FIG. 2 illustrates a user installing a roof-mounted fan system 214 on a building 200. FIG. 2 also illustrates a roof 204, a user 216, and a ladder 218. As illustrated, the user 216 is installing the roof-mounted fan system 214 near the apex of an angled roof 204. Indeed, the user 216 has managed to carry the bulky roof-mounted fan system 214 up the ladder 218 at something of a risk of dropping the fan system and/or falling off the ladder 218 (or otherwise damaging the fan system and/or injuring him/her self). Moreover, having managed to carry the roof-mounted fan system 214 aloft, the user 216 must now perch at the top of the ladder 218, maneuver it into place, and mount it to the roof. 204. To do so, the user 216 must often reach around the roof-mounted fan system 214 to its opposite side which the user 216 cannot see, much less reach conveniently.

Further still, the user 216 must then access the under side of the roof-mounted fan system 214 from the attic of the building 200 to provide power to the roof-mounted fan system 214. That power might or might not be available at the location of the roof-mounted fan system 214. Thus, the user 216 might need to run wires, a conduit, etc. to the roof-mounted fan system 214 as well as wire it to a thermostat if thermostatic control of the roof-mounted fan system 214 is desired. In the alternative, the user 216 might have purchased a roof-mounted fan system 214 with an add-ons solar panel. However, solar panels are often considered eyesores and add-on solar panels typically aggravate this condition. Indeed, some homeowners associations (HOA), municipalities, etc. place restrictions on the use of solar panels on roofs 204 (and/or other locations).

Further still, with heretofore-available roof-mounted fan systems, the solar panels are simply added to the fan systems with little or no attempt to incorporate the solar panels into the aesthetic design of these fan systems. Thus, these solar panels detract from the aesthetic features of these heretofore-available roof-mounted fan systems 214. Moreover, the solar panels (on installed roof-mounted fan systems 214) might or might not point toward the sun thereby reducing their efficiency to a point at which they might not be able to adequately drive the fan systems.

FIG. 3 further illustrates a user installing a roof-mounted fan system 214. More particularly, FIG. 3 illustrates a flashing 320, a penetration 322, rafters 324, a roof deck 326, roofing materials 328, and tools 330. The user, of course, could be a worker, home (or building) owner, a maintenance technician (electrician or mechanic perhaps), or other user. Nonetheless, the roof-mounted fan system 214 is often so bulky that the user 216 can barely get their arms around it and must carry it in a position whereby its center of gravity is relatively distant from the user 216. Heretofore-available roof-mounted fan systems 214 also happen to be heavy, which makes carrying and maneuvering these roof-mounted fan systems 214 that much more difficult. More specifically, the user 216 must (despite these challenges) maneuver the roof-mounted fan system 214 over the penetration 322, center it, and secure it to the roof deck 326.

As those skilled in the art will appreciate, roof deck 326 rests on numerous rafters 324. Typically, the rafters 324 are long 2"×4" boards which (laid in an appropriate manner) can support the weight of the roof deck 326, material (for instance, snow, water, etc.) on it, users 216, wind loads (with appropriate bracing), etc. Typically, the rafters 324 are spaced apart by 24 inches and/or correspond (in spacing) to the typical 4×8 foot size of the plywood panels that make up the roof deck 326. Other rafter 324 spacing dimensions are possible though. Moreover, the rafters 324 and/or roof deck 326 are typically pitched at angles corresponding to a rise/fall of 3 inches per foot although buildings having different roof pitches (for instance, 7 and 10 roof pitches) are certainly in existence and within the scope of the current disclosure. Indeed, some roofs 304 are flat (or have pitches much less than 3 inches per foot) and might have rafters 324 with increased dimensions to better bear the loads associated with such roof pitches.

The roof deck 326 itself is typically made of 4×8 foot sheets of plywood on which the roofing materials 328 are secured. In many cases, those roofing materials 328 include an underlying layer(s) of tarpaper and one or more layers of shingles. The tarpaper serves to waterproof the roof 304 so that rain, snowmelt, and/or other forms of water cannot penetrate the roof 304 and/or seep into the building. The tarpaper typically rests on the plywood of the roof deck 326 with the shingles overlying it. The shingles are thicker and more durable than the tarpaper and primarily serve to protect the tarpaper from damage by the elements, workers, objects falling (or being blown) onto the roof 304, etc. Shingles are typically applied to the roof 304 in overlapping rows with the lower ends of shingles in higher rows resting on the upper ends of the shingles in lower rows. Moreover, shingles in adjacent rows are positioned such that the gaps between shingles of a given row do not align with gaps in adjacent rows. Thus, these features tend to waterproof the roof 304 when taken together so long as no penetration through the roofing materials 328 occurs. Note that roofs with ceramic tiles, concrete tiles, sheet metal (corrugated or otherwise), wooden shakes, etc. are within the scope of the current disclosure.

With continuing reference to FIG. 3, installing a roof-mounted fan system 214 on a roof 204 typically requires that a relatively large penetration 322 be made in the roof 204 and roofing materials 328. Indeed, to install a roof-mounted fan system 214 most users 216 would enter the crawl way 105 beneath the roof 204 and select a location (usually near the roof apex) for the fan system. They would then find a space between two rafters 324 for the fan system. If the space is large enough to accommodate the fan system, the user 216 often drills a hole (hammers a nail, etc.) through the roof deck 326 at the desired location for the center of the fan system. They then climb down out of the crawl way 105, exit the building, and climb to the top of the roof 204 where they would locate the previously drilled hole. Using a compass of sorts, the user 216 then typically marks the location of the intended periphery of the penetration 322 in accordance with the diameter of an opening in the fan system. Then, using an appropriate saw or other tool(s), the user 216 cuts through the shingles, tarpaper, other roofing materials 328, and the roof deck 326 to form the penetration 322.

FIG. 4 still further illustrates a user installing a roof-mounted fan system. Once the penetration 322 is prepared, the user 216 then maneuvers the bulky roof-mounted fan system 214 into position roughly over the penetration 322. But, provision must usually be made to prevent water from entering the building 200 through the penetration 322. For such reasons, the roof-mounted fan system 214 includes the flashing 220 around its lower end that, if properly installed (each time a roof-mounted fan system 214 is installed, replaced, etc.), will exclude such water. Accordingly, the user 216 must lift the roofing material 328 near one of the sides of the penetration 322 and apply caulk (or some other sealant) to the roof deck 326 before sliding the flashing 320 underneath the temporarily lifted roofing material 328. The user 216 must repeat these actions for every side of the penetration 322/fan system.

Moreover, the user 216 must do so without damaging the remaining roofing material 328; while not being able to see around the fan system; and by maneuvering that bulky, awkward, roof-mounted fan system 214 to make even small positional adjustments. With roof-mounted fan systems 214 heretofore-available, it is quite likely that the installation will fail in at least some of these regards thereby allowing water to penetrate the building 200 (not to mention perhaps leading to an installation with an un workman-like appearance). The user 216 can then tamp the roofing material 328 down over the flashing 320 of the fan system and hope that wind does not "get under it" and remove it from the roof 204 thereby leading to yet more damage to the building. Of course, the user 216 typically also has to reenter the crawl way 105 (from the other side of the roof 204) and connect power to the roof-mounted fan system 214. Accordingly, the installation of each heretofore-available fan systems 214 tends to be time-consuming, expensive, and prone to failures, errors, omissions, etc.

FIGS. 5-8 illustrate a two-piece fan system with a solar panel in various positions. The two-piece fan system 500 of the current embodiment comprises at least two-pieces: a fan housing 502 and a base 504. The two-piece fan system 500 of the current embodiment also includes a solar panel 506 and adjustable bracket 508 as well as flashing 510. The fan housing 502 contains a fan, motor, and associated bearings, races, etc. and airflow guides, vanes, etc. It therefore contains the active mechanical components of the two-piece fan system 500 of the current embodiment. Moreover, the solar panel 506 and adjustable bracket 508 operationally couple with the fan housing 502. The fan housing 502, additionally, can include wiring to electrically connect the solar panel 506 to the fan and perhaps some controls (for instance, thermostats, thermal cut-off switches, remote control circuitry, etc.) for the fan motor.

Mechanically, the adjustable bracket 508 operatively couples the solar panel 506 to the fan housing 502. In some embodiments, the adjustable bracket 508 includes one or more "stops," at which it can be locked, to position the solar panel 506 in a corresponding number of positions relative to the fan housing 502. Thus, the solar panel 506 pivots about the fan housing 502 through an angle $\alpha 1$ between its stowed position (see FIG. 6) and its extended position (FIG. 5) and through the various intermediate stop-related positions. These positions allow a user 216 to more accurately point the solar panel 506 at the sun or other light source as might be desired. Indeed, by orienting the fan housing 502 and using the adjustable stops, users 214 can orient the solar panel 506 to point generally toward the sun in many if not all locations including many north-facing roofs. A range of angle $\alpha 1$ from 0 degrees in the stowed position to about 45 degrees has been found to be satisfactory for such purposes.

In the stowed position, though, the solar panel 506 rests in the fan housing 502 with its surface flush with the nominally upper surface of the fan housing 502. In this position, the adjustable brackets fold into the housing thereby allowing the solar panel 506 to appear to be embedded in the housing and/or flush with its surface.

The fan housing 502 also defines one or more vents/drains 512. These vents/drains 512 provide a flow path around the solar panel 506 when the solar panel 506 is in its stowed position, flush with (or embedded in) the fan housing 502. In this way, even when the solar panel 506 is stowed some air can flow beneath it and cool it. These vents/drains 512 can also serve as finger holds for users 214 to reach underneath the solar panel 506 and lift it to one of its non-stowed positions. They also allow for water to drain from under the solar panel 506.

Furthermore, the fan housing 502 of the current embodiment defines a low profile and has an overall oblong, rounded shape. The vents/drains contribute to this low profile (a height less than about 7" in some embodiments and less than about 3" in the current embodiment), rounded appearance in that they are formed integrally with the (nominally) upper portions of the sides of the fan housing 502. The vents/drains 512 are also rounded at least in part for aesthetic considerations. Note that the fan housing can be made of some paintable material such as ABS (Acrylonitrile butadiene styrene) plastic so that the two-piece fan system 214 can be painted in accordance with user desires, local aesthetic rules, deed restrictions, ordinances, etc.

Figure 5:
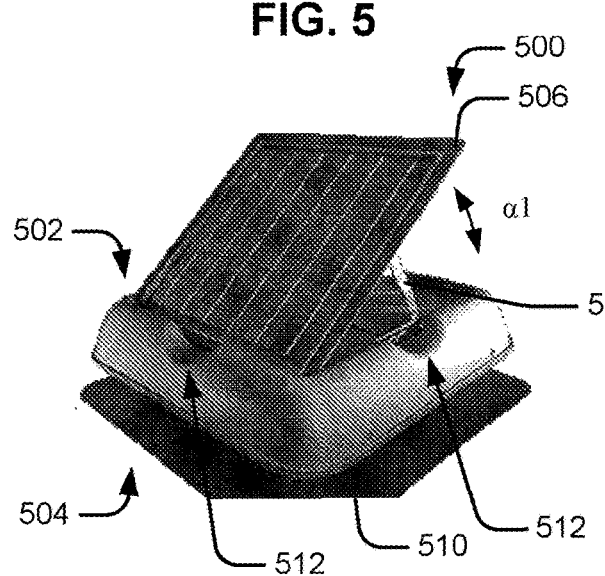
FIG. 5 illustrates a two-piece fan system with a solar panel in an extended position.
Figure 6:
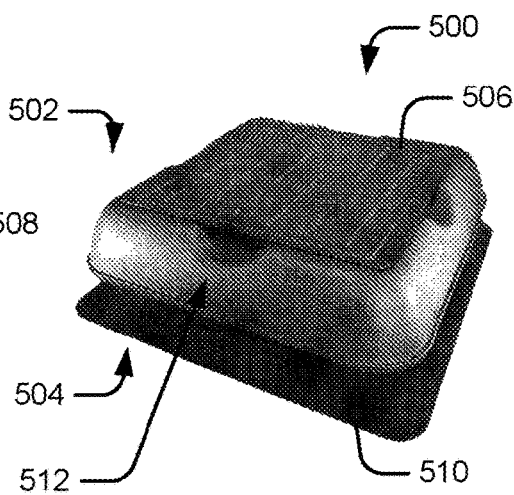
FIG. 6 further illustrates a two-piece fan system with a solar panel in a stowed position.
Figure 7:
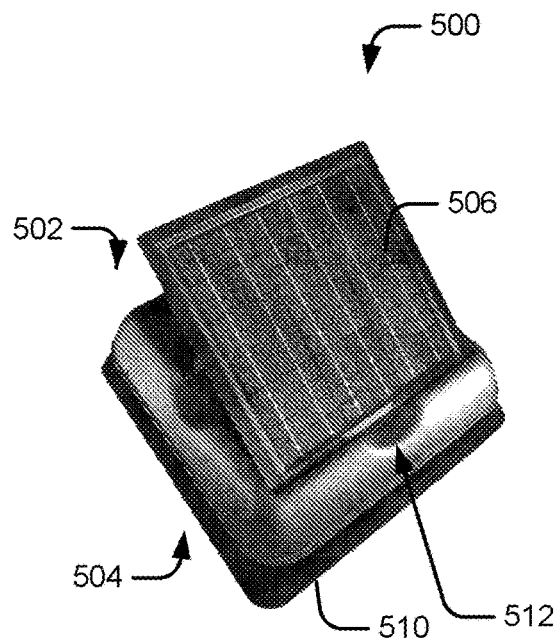
FIG. 7 illustrates aspects of a two-piece fan system.
Figure 8:
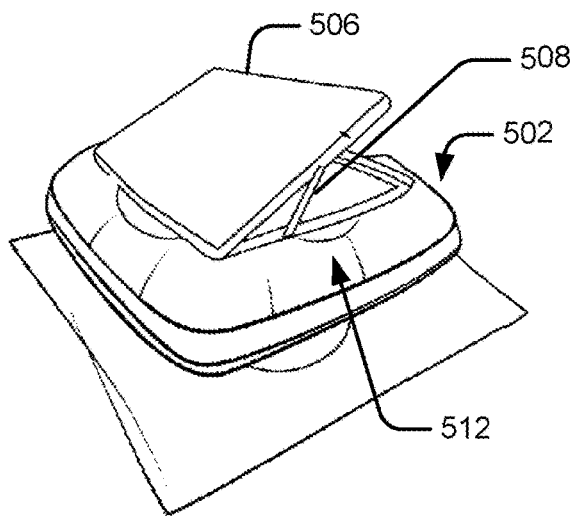
FIG. 8 illustrates a fan assembly of a two-piece fan system.

Note that FIGS. 5-7 illustrate the two pieces (the fan housing 502 and the base 504) of the two-piece fan system 500 according to exemplary embodiments being coupled together. FIG. 8, in contrast, illustrates the fan housing 502 separate and apart from any base 504. Indeed, the base 504 can be installed on various roofs 204 with the fan housings 502 being installed at some different time and/or interchanged with one another. In accordance with the current embodiment, therefore, the fan housings 502 can be interchanged with one another, removed, replaced, etc. without disturbing the roof 204, the roof deck 326, the roofing materials 328, etc. and without tools 330 and the like. Furthermore, once a base 504 of suitable size is installed on a roof 204, the user can "install" a "fan" by merely carrying a fan housing 502 to the already installed base 504, placing it on the base 504, and removably coupling that fan housing 502 to the base 502. In the current scenario, the user 216 need not carry or maneuver the (bulk of the) base 504, flashing 510, etc. Thus, the current embodiment facilitates the installation (and/or replacement, maintenance, etc.) of fan systems while eliminating much of the work, expense, and inconvenience associated therewith.

Figure 9:
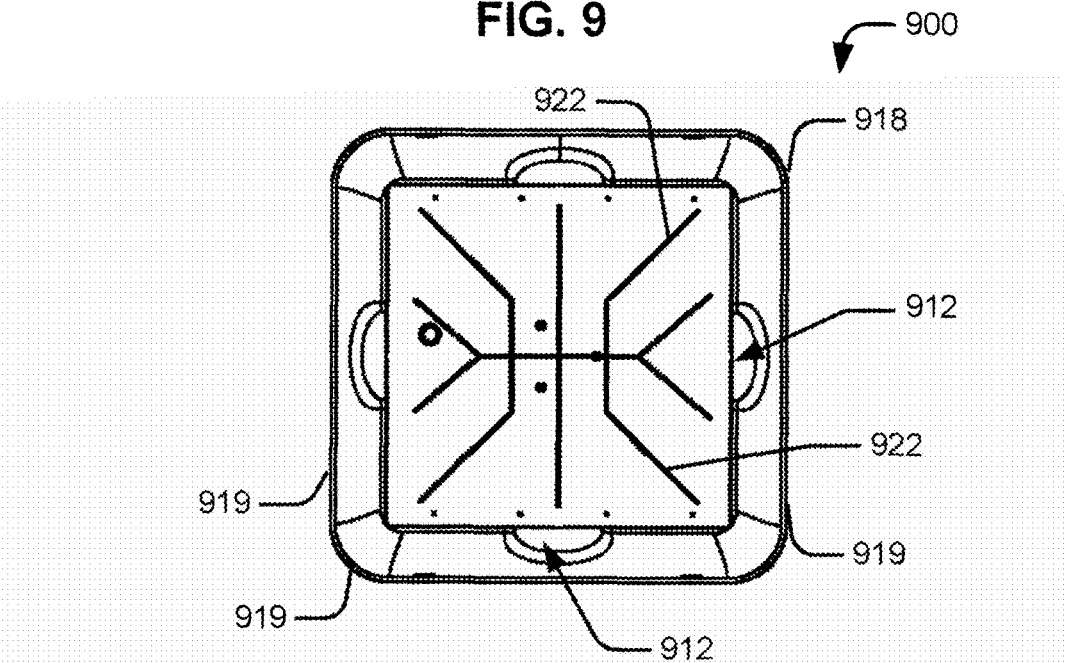
FIG. 9 illustrates a top plan view of a housing of a two-piece fan system.

FIG. 9 illustrates a top plan view of a housing of a two-piece ventilation system. More particularly, FIG. 9 illustrates a fan housing 900, vents/drains 912, a body 918, sides 919, a recess 920, and ribs 922. As alluded to elsewhere herein, the body 918 of the fan housing 900 contains a fan, its blades, etc. and defines the vent/drains 912. Additionally, in the current embodiment, the body 918 also defines the recess 920 into which the solar panel 506 fits and/or appears to be embedded (when stowed) in the housing. Those solar panels 506 can be made from a variety of materials, including but not limited to polycrystalline, multicrystaline, monocrystaline, etc. without departing from the scope of the current disclosure. In some embodiments, the body 918 also defines one or more of the ribs 922 on its nominally upper surface in the recess 920. These ribs 922 can provide a degree of rigidity to that surface and can allow some space between it and the solar panel 506 (when stowed). This space can allow the solar panel 506 to breath and thus remain relatively cool during operation (and during non-operation). This space also allows the area under/behind the solar panel 506 to drain should moisture be present.

Figure 10:
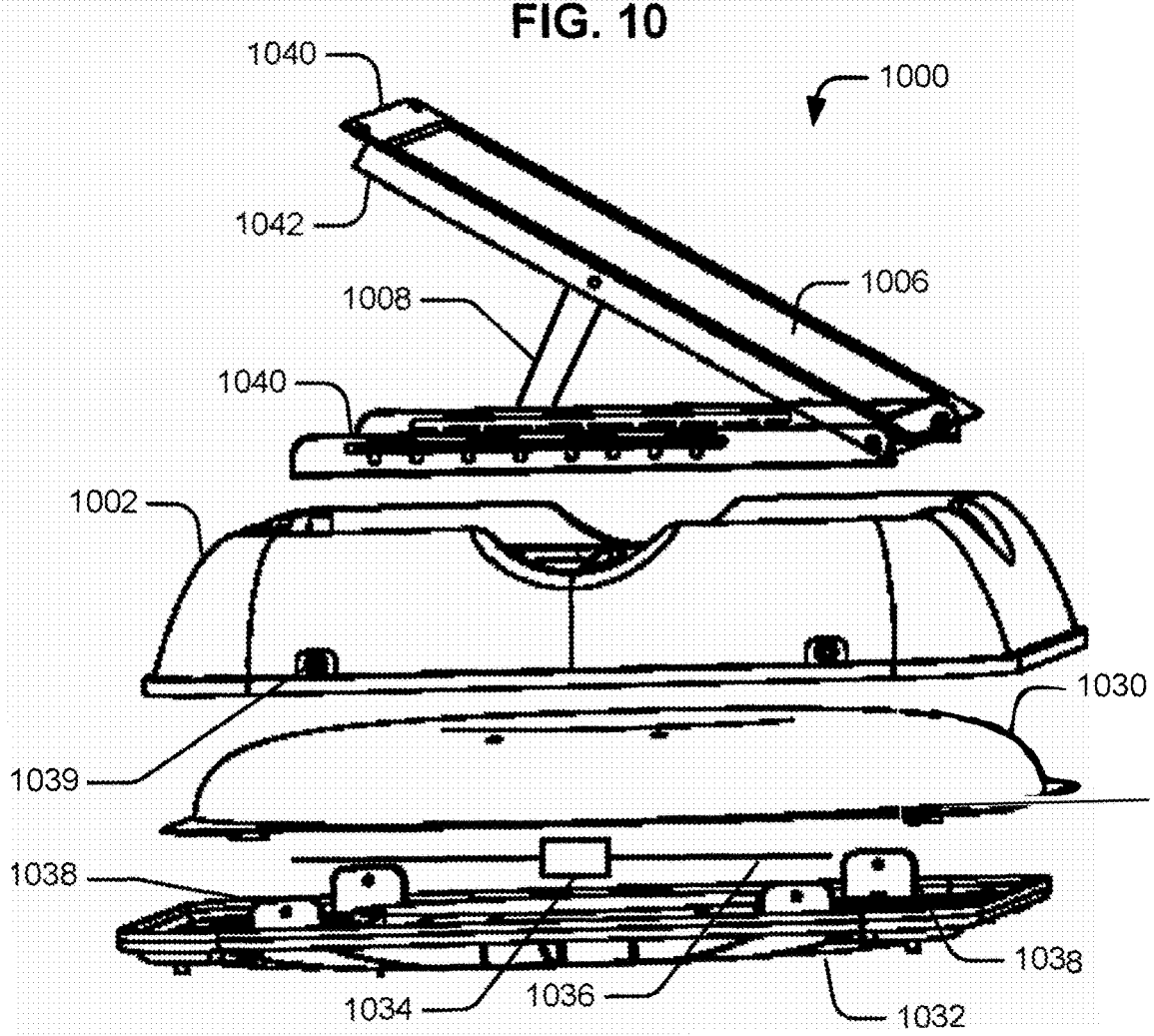
FIG. 10 further illustrates an exploded view of a fan assembly for a two-piece fan.

FIG. 10 further illustrates an exploded view of a housing for a two-piece fan system. More particularly, FIG. 10 illustrates the fan system 1000 and its housing 1002, solar panel 1006, adjustable brackets 1008, cowling 1030, closure 1032, fan motor 1034, fan blades 1036, bosses 1038, fastener holes 1039, and rails/locks 1040. Generally, the fan motor and blades 1034 and 1036 (as a unit) respectively fit inside the cowling 1030 which fits inside the housing 1002. The closure 1032 along with the housing 1002 (and appropriate fasteners) closes the fan 1000 as an assembly and clamps it together. As is disclosed further with regard to FIG. 11, the closure 1032 defines at least one aperture that allows the fan to draw air into itself while the cowling 1030 is shaped and dimensioned to smoothly turn that flowing air with relatively low head loss back toward the closure 1032 in a relatively small axial distance (less than 4-7" in many embodiments). In some embodiments, the cowling 1030 eliminates air pockets and associated energy wasting eddy currents therein. The cowling 1030 can also include guide vanes for the air if desired. The closure 1032 also defines at least one aperture which allows the (turned) airflow to exit the fan system 1000. Thus, the air flows upward through the closure 1032, through the fan blades 1036 (which drive the airflow at least in part), through the turn guided by the cowling 1030, and then back out through the closure 1032.

As further illustrated by FIG. 10, the closure 1032 defines one or more bosses 1038 with holes adapted to receive closure fasteners. Those holes align with the fastener holes 1039 on the housing 1002. Thus, with the cowling 1030 and fan blades 1036 and fan motor 1034 in the housing 1002, fasteners can be used to assemble the fan system 1000 into a separate, stand-alone unit.

FIG. 10 also shows that the solar panel 1006 can include or be operationally coupled to the adjustable brackets 1008. The adjustable bracket 1008 can cooperate with the corresponding rails/locks 1040 to allow users to adjust the position of the solar panel 1006 with respect to the housing 1002. The rail/locks 1040 can also, or in the alternative, cooperate with the adjustable brackets 1008 to lock the solar panel 1006 in one or more of those positions.

In the current embodiment, a frame 1041 surrounds, holds, and/or supports the solar panel 1006. While the frame 1041 of the current embodiment can provide structural support to the solar panel, another function it provides is to shield the solar panel 1006 from the environment, physical damage/abuse, and form being seen. Thus, the frame 1041 aids in preserving the aesthetic appearance of the fan system and/or its housings. Furthermore, the frame 1041 can be (spray) painted in accordance with user desires, homeowner association rules, ordinances, etc. A backing 1042 can also be applied to the side of the solar panel 1006 closest to the body of the two-piece fan system 1000. It too can be painted and/or it can be black so as to shield the backside of the solar panel from view and to aid in the aesthetic features of the fan system.

Figure 11:
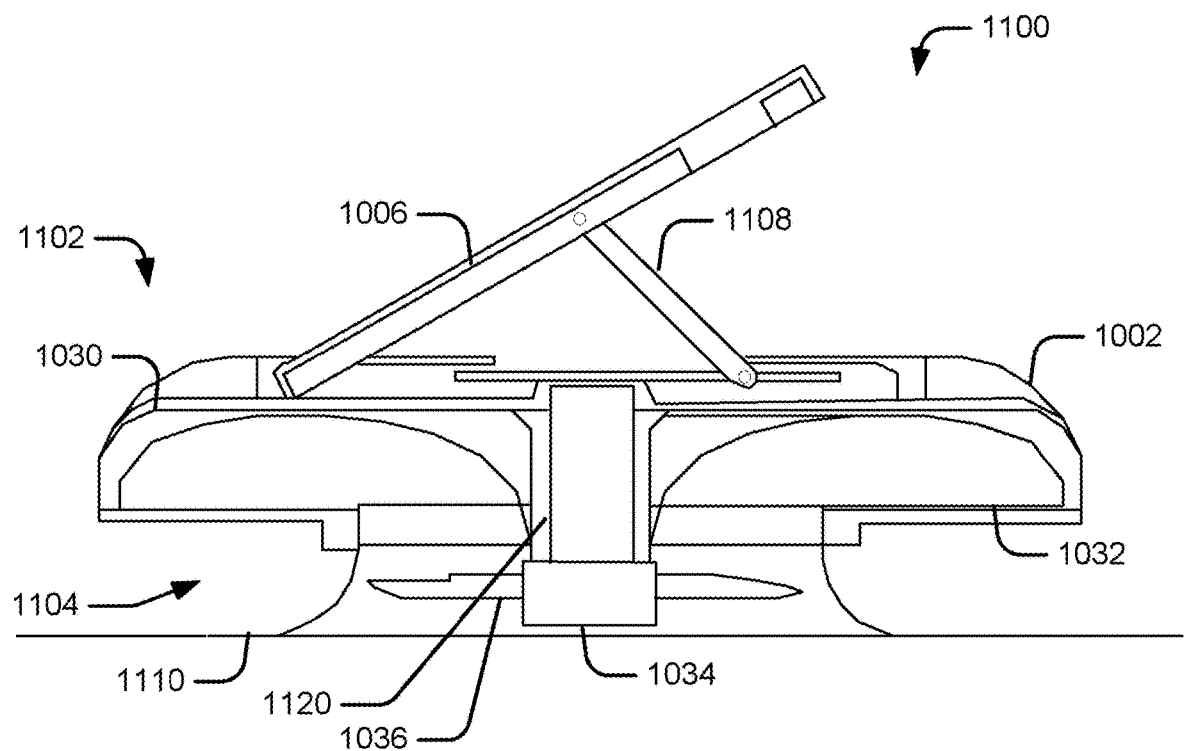
FIG. 11 illustrates a cross-sectional view of a two-piece fan system.

FIG. 11 illustrates a cross-sectional view of a two-piece fan system. More particularly it shows the fan motor 1034 and fan blades 1036 assembled within the cowling 1030 which is itself within the housing 1002. Further, FIG. 11 illustrates the closure 1032 fastened to the housing (via fasteners in the fastener holes 1039 and bosses 1038) and clamping the fan assembly 1102 together. FIG. 11 also shows the two-piece fan system 1100 with the solar panel 1006 operationally coupled to the fan assembly 1102 via the adjustable bracket 1008. Moreover, FIG. 11 illustrates the base 1104 includes flashing 1110, where the base 1104 is releasably attached to the fan assembly 1102. Note that the fan assembly 1102 and base 1104 can be separated from one another with, if desired, the base 1104 being coupled to and/or being installed on a roof or other structure. In the embodiment illustrated by FIG. 11, furthermore, the various components of the two-piece fan system 1100 are coaxial with one another although they need not be for the practice of the current embodiment.

Moreover, FIG. 11 illustrates a motor bracket 1120. In the current embodiment, the motor bracket 1120 defines various attachment points corresponding to various motors. Thus, it can allow for the interchange of motors as might be desired. The motor bracket 1120 can also provide physical protection to the motor and/or its coupling to the fan blades against mechanical damage from, for instance, animals that might intrude into the fan housing. This feature helps keep the fan blades in balance, running smoothly, and without undue noise.

Figure 12:
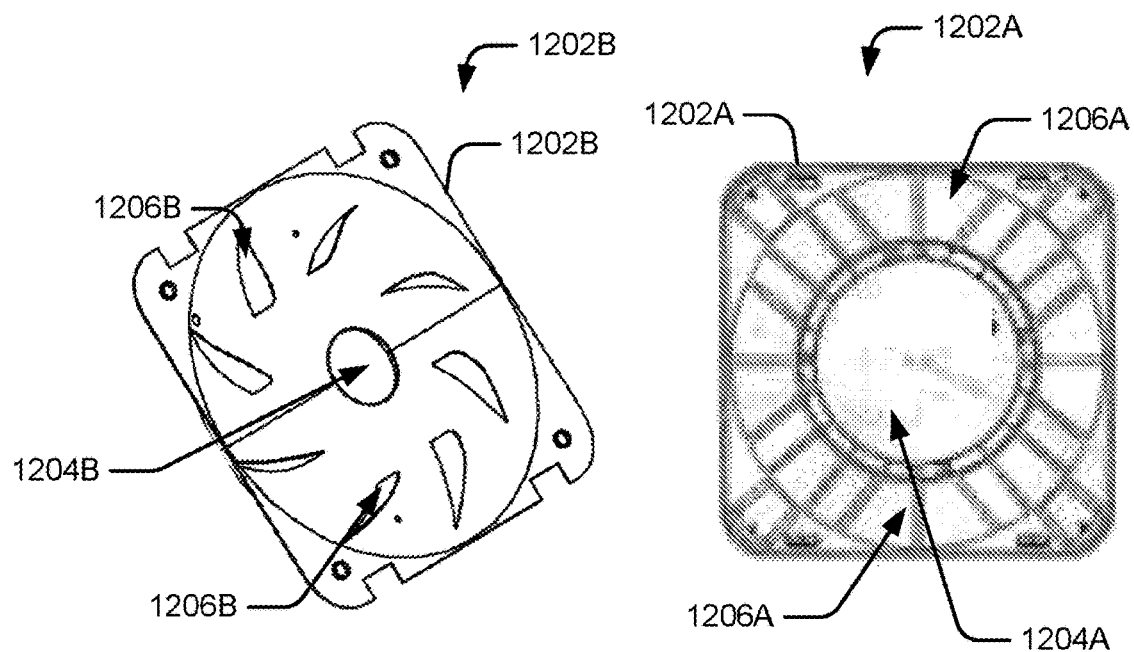
FIG. 12 illustrates a top plan view of a pair of closures for two-piece fan systems.

FIG. 12 illustrates a top plan view of a pair of closures for two-piece fan systems. Both closures 1200A and B include a generally planar body 1202A and B shaped and dimensioned to fit into the open end of various housings 1002. The closures 1200A and B also define, respectively, central apertures 1204A and B through which the various fans (or fan blades 1136) can draw air. The closures 1200A and B also defined a plurality of apertures 1206A and B through which air, driven by the fan blades 1136, can flow from the fans. In some embodiments, the closures 1200 can include a screen over one or more of the apertures to, for instance, keep insects, birds, rodents, other animals, debris, water, etc. out of the fans.

Figure 13:
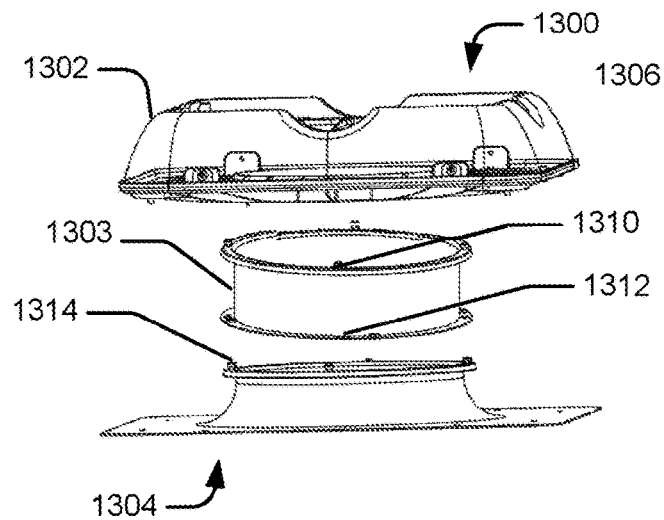
FIG. 13 illustrates an exploded view of a two-piece fan system.

FIG. 13 illustrates an exploded view of a two-piece fan system. More particularly, FIG. 13 illustrates a two-piece fan system 1300 including a fan assembly 1302, a riser 1303, and a base 1304. The fan assembly 1302, of the current embodiment, includes a fan (a motor and a set of blades in this embodiment), a housing, and a closure. In FIG. 13 a solar panel is not shown although the two-piece fan system 1300 could include a solar panel with or without adjustable brackets. The base 1304 includes a flashing and is shaped and dimensioned to be attached to a roof, roof curb, or other structure and to lend the two-piece fan system 1300 stability when installed.

In the current embodiment, the two-piece fan system 1300 also includes the riser 1303 which could be considered as a part of the base 1304 or the fan assembly 1302 or even a third component/assembly of the "two-piece" fan system 1300. The riser 1303 is shaped and dimensioned to reside between the fan assembly 1302 and the base 1304. While it can be coaxial with the other pieces of the two-piece fan system 1300, it does add height to the two-piece fan system 1300. In other words, the riser 1303 (or extender) spaces the fan assembly 1302 apart from the roof or other structure to which the two-piece fan system 1300 might be mounted. Thus, should water, snow, ice, debris, etc. accumulate around the base 1304, the operation of the fan system can remain relatively un-affected. But, the extension need not be in a vertical direction to practice the current embodiment.

Moreover, because the open end of the riser 1303 (when installed on a base 1304) might be clear of such debris, a two-piece fan system 1300 (or rather a fan assembly 1302 of a two-piece fan system 1300) can be installed even in the presence of that debris in many cases. Indeed, since 5-6" of snow is often considered to be good insulation, users can install fan assemblies on risers with lengths of about 6" without disturbing that snow. For roofs covered with sod, dirt, grass, sand, gravel, etc. two-piece fan systems (with risers and/or riser portions) of embodiments provide similar features.

FIG. 13 also illustrates that risers 1303 of the current embodiment can include two sets of quick attachment coupling halves, male half 1310 and female half 1312. These coupling halves 1310 and 1312 can be shaped and dimensioned to mate with corresponding coupling male halves 1314 on the bases 1304 and fan assemblies 1302. Also, if desired, one set of the coupling halves 1310 or 1312 can be adapted to mate with corresponding coupling halves on the fan assemblies 1302 while the other set (on the riser 1303) can be adapted to mate with the coupling halves on the bases 1304. In such manners, risers 1303 can be stacked one atop another to extend the fan assemblies 1302 to lengths determined by the dimensions of the selected risers 1303 and/or their numbers. If desired, the various coupling halves 1310, 1312, and/or 1314 can be adapted to pull the various components/assemblies 1302, 1303, and/or 1304 into close fitting and/or weather proof alignment with one another. Additionally, or in the alternative, these components 1302, 1303, and/or 1304 can be adapted to be used with gaskets, O-rings, sealants, and/or other weatherproofing techniques to prevent water intrusion, air infiltration, etc. through the joints there between.

Figure 14:
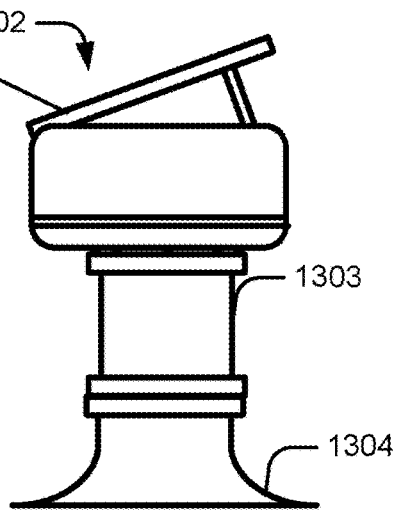
FIG. 14 illustrates a two-piece fan system installed on a roof.
Figure 15:
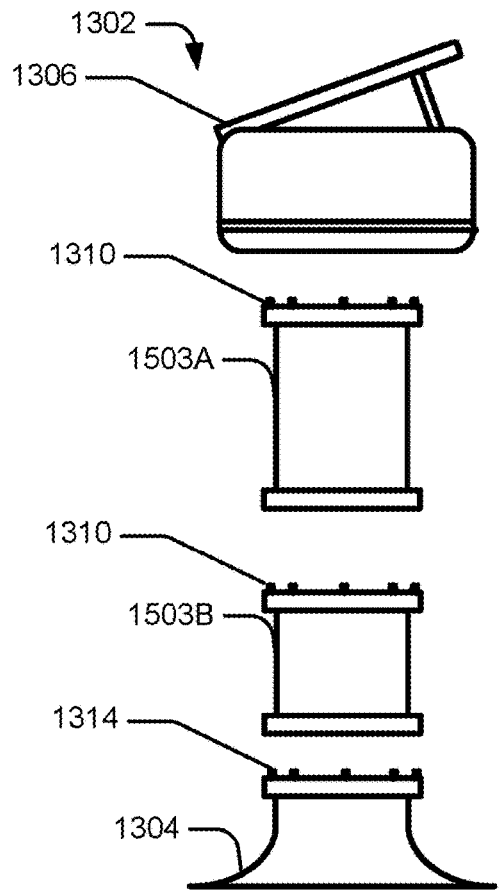
FIG. 15 illustrates an exploded view of a two-piece fan system with a riser.
Figure 16:
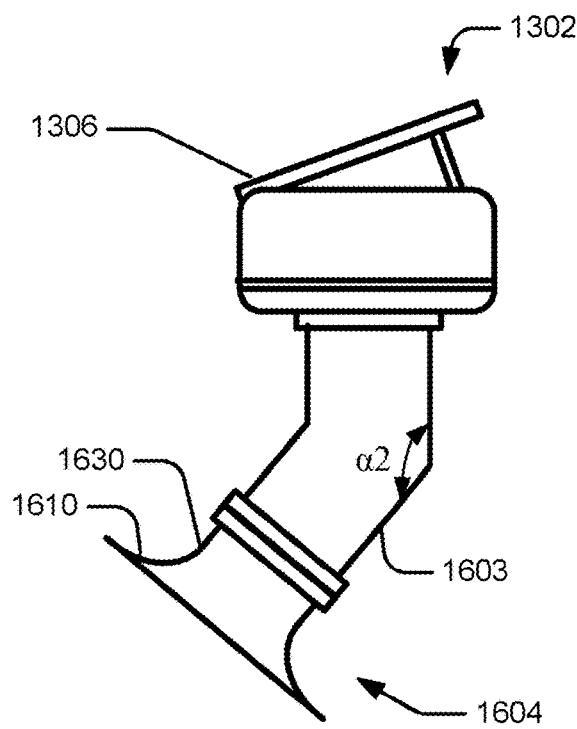
FIG. 16 illustrates a two-piece fan system with a riser installed on a roof.

FIG. 14 illustrates such a two-piece fan system installed on a roof with a riser 1303 installed between the fan assembly 1302 and the base 1304. FIG. 15 illustrates an exploded view of a two-piece fan system and multiple risers 1503A and 1503B installed therewith. FIG. 15 also shows that such multi-riser two-piece fan systems 1500 can include a solar panel and adjustable brackets) coupled thereto. FIG. 16 illustrates a two-piece fan system with a riser installed on a roof. In the embodiment illustrated in FIG. 16, the riser 1603 is configured to turn through an angle α2. That angle α2 could correspond to one of the common angles at which roofs are pitched although it need not do so. In such cases though, the use of the angled riser 1603 can serve to turn the orientation of the two-piece fan system (or fan assembly 1602) to some desired direction such as vertical (as shown). Moreover, in some embodiments, one or more risers can be used in combination/conjunction with other risers whether straight, angled, or otherwise. FIG. 16 also illustrates, in at least some sense, that the base 1604 can be considered an assembly. For instance, the base 1604 could define or comprise a flashing portion 1610 coupled to a riser portion 1630. The riser portion 1630 could further define, comprise, be coupled to, etc. quick attachment couplings.

Figure 17:
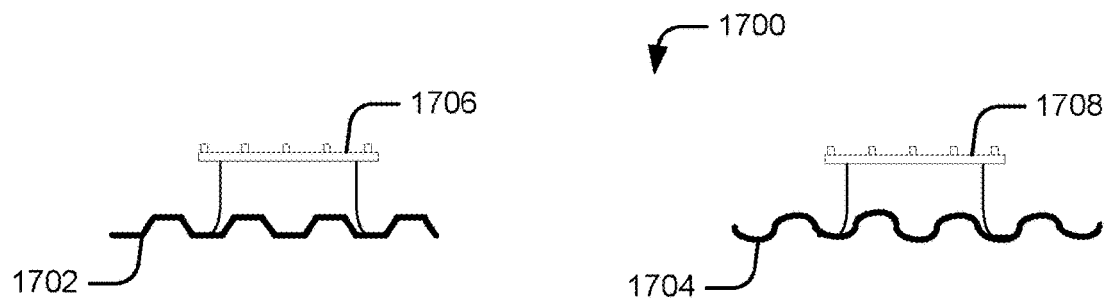
FIG. 17 illustrates a corrugated roof and bases for two-piece fan systems.

FIG. 17 illustrates a corrugated roof and bases for two-piece fan systems. More particularly, the corrugated roof 1700 of the current embodiment includes a portion 1702 which appears trapezoidal when viewed in cross-section and a portion 1704 which appears sinusoidal in cross-section. The corrugated roof 1700 also includes two bases 1706 and 1708 which, respectively define flashings with corresponding corrugated trapezoidal and sinusoidal cross-sections. Thus, embodiments allow two-piece fan systems to be installed on, mounted on, attached to, etc. corrugated roofs without altering the corresponding risers and/or fan assemblies.

Figure 18:
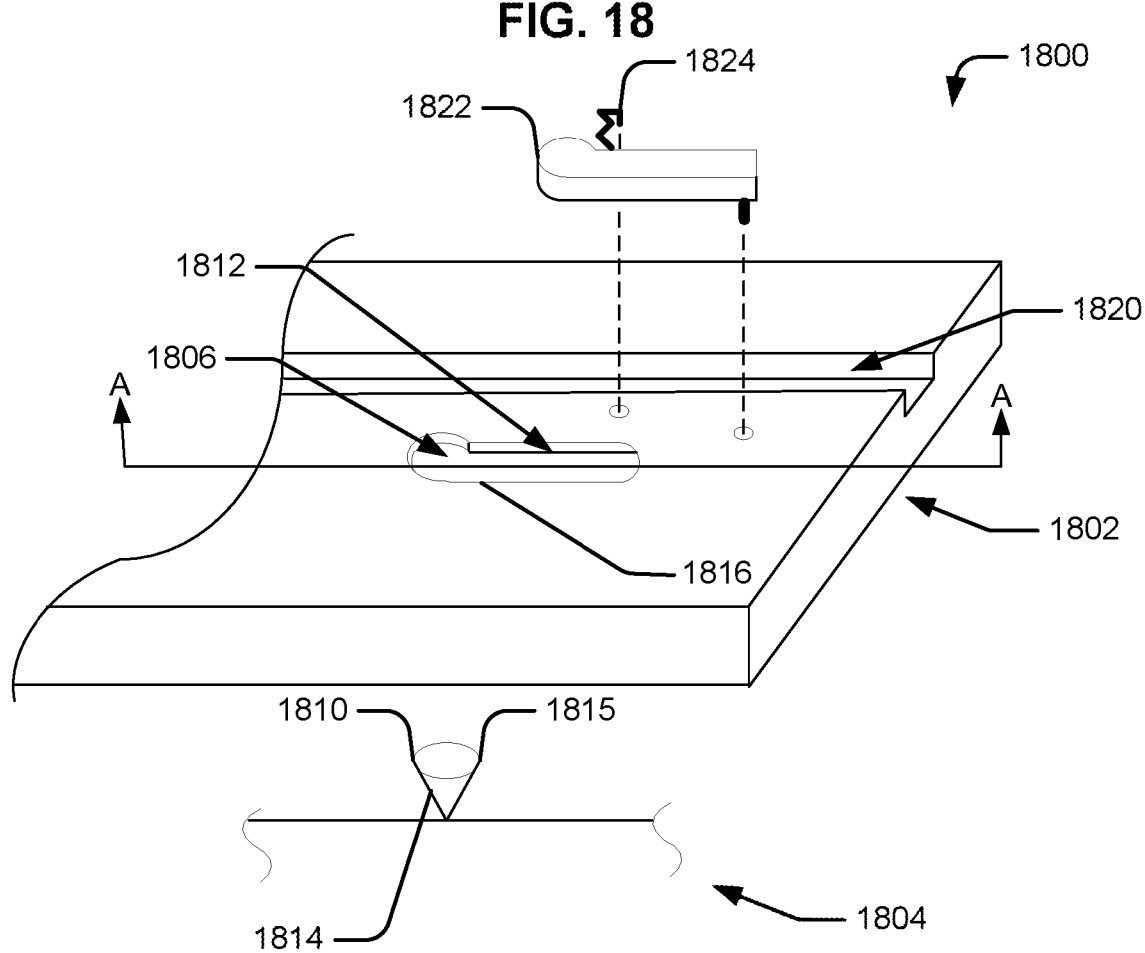
FIG. 18 illustrates one half of a quick attachment coupling for two-piece fan systems.
Figure 18A:
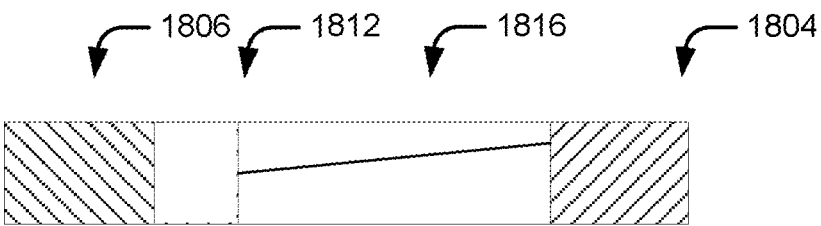
FIG. 18A illustrates a cross-sectional view as seen along line AA in FIG. 18.

FIG. 18 illustrates a quick attachment coupling for exemplary ventilation systems according to embodiments of the present invention and FIG. 18A illustrates a cross-sectional view a first half of the quick attachment coupling as seen along line AA of the first half in FIG. 18. More particularly, FIGS. 18 and 18A illustrate that the quick attachment coupling 1800 of the current embodiment defines a male half 1804 and a female half 1802 with the two halves being designed to releasably engage each other and to releasably couple assemblies of two-piece fan systems together. Thus, these male and female halves 1804 and 1802, respectively, can be shaped and dimensioned to withstand wind (and/or other) loads likely to be imposed on various two-piece fan systems with and/or without risers. Additionally, these coupling halves 1802 and 1804 can be shaped and dimensioned to draw the fan assemblies together with sufficient force to form a seal there between in the presence and/or absence of gaskets, O-rings, and/or other sealing structures/devices.

With continuing reference to FIG. 18, the female half 1802 of the current embodiment can define a relatively large aperture 1806 which can accept a corresponding and/or relatively large portion 1810 of the male half 1804. These structures allow the halves 1802 and 1804 to engage each other and disengage from each other. The female half 1802 can also defines a narrow aperture 1812 which can accept a corresponding small portion 1814 of the male half 1804. Thus, once the halves 1802 and 1804 are engaged with each other, the narrow portion 1814 of the male half 1804 can be slid along the narrow aperture 1812 of the female half 1802 so that the halves 1802 and 1804 can remain engaged with each other despite axial forces imposed on their corresponding fan assemblies. The halves 1802 and 1804 can also remain in sliding engagement with one another (at least for some distance) in such circumstances even if some torsional forces attempt to rotate one fan assembly relative to the other in the current embodiment. Nonetheless, such features allow assemblies of embodiments to be releasably coupled to one another with a twist of one assembly relative to another.

FIG. 18 illustrates that the male and female halves 1804 and 1802, respectively, define guide surfaces 1815 and 1816. These guide surfaces 1815 and 1816 can be shaped and dimensioned such that, as the coupling halves 1802 and 1804 slide relative to one another, the guide surfaces 1815 and 1816 urge the halves 1802 and 1804 toward one another (axially) thereby drawing the respective assemblies into abutting relationship. Moreover, the guide surfaces 1815 and 1816 can be configured to impart enough force on the respective fan assemblies to form a seal there between. That seal can be made, enhanced, etc. with a gasket, O-ring, etc. which might/might not be positioned in a groove 1820 in the surface of one fan assembly or another.

Further still, in some embodiments, the quick attachment coupling 1800 includes a latch 1822. The latch 1822 can be positioned on the fan assembly with the female half 1802 to releasably capture the male half 1804 as the halves engage each other. In some embodiments, the latch 1822 (and the coupling halves 1802 and 1804) is configured and positioned to be released manually. In addition, or in the alternative, the latch 1822 can be biased into a position (for instance a locked/latched position) by a biasing members such as a spring 1824.

Figure 19:
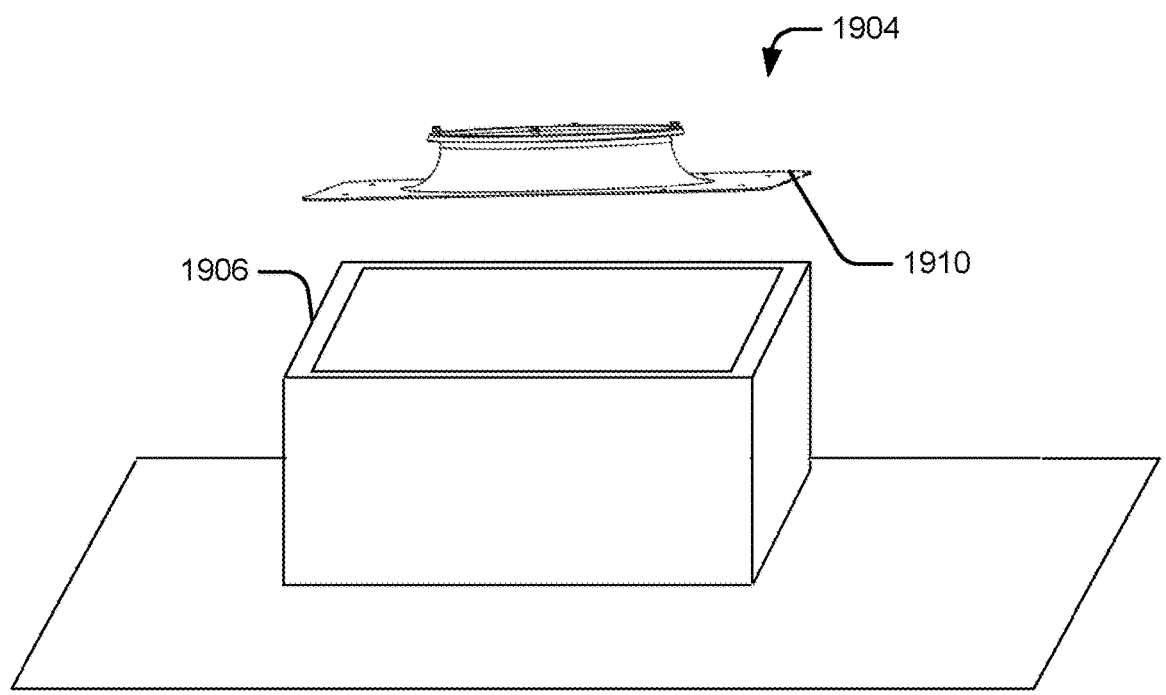
FIG. 19 illustrates another two-piece fan system and a roof curb.
Figure 19A:
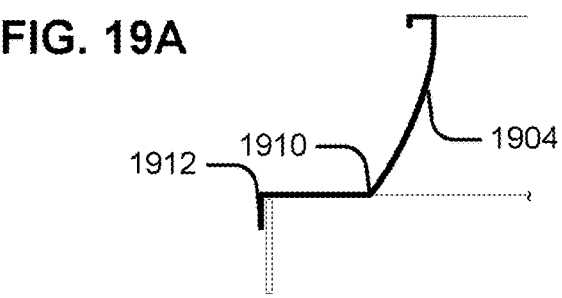
FIG. 19A illustrates a cross-sectional view of the base of FIG. 19.

FIG. 19 illustrates a base for a two-piece fan system and FIG. 19A illustrates a cross-sectional of the base 1904 of FIG. 19. The base 1904 of the current embodiment mates with rectangular roof curbs 1906 so that two-piece fan systems can be mounted thereon in accordance with embodiments. Instead of a flashing, the base 1904 defines an adaptor 1910 shaped and dimensioned to mate with the roof curb 1906 and to seal thereto. Quick attachment couplings, fasteners, etc. can be used to secure the adaptor 1910 (and base 1904) to the roof curb 1906. Moreover, the adaptor 1910 can further define a lip 1912 which can aid in registering the base 1904 with the roof curb 1906. The lip 1912 can also assist in sealing the joint between the base 1904 and the roof curb 1906 and can be used as a location for quick attachment couplings, fasteners, etc. for securing the base 1904 to the roof curb 1906.

Figure 20:
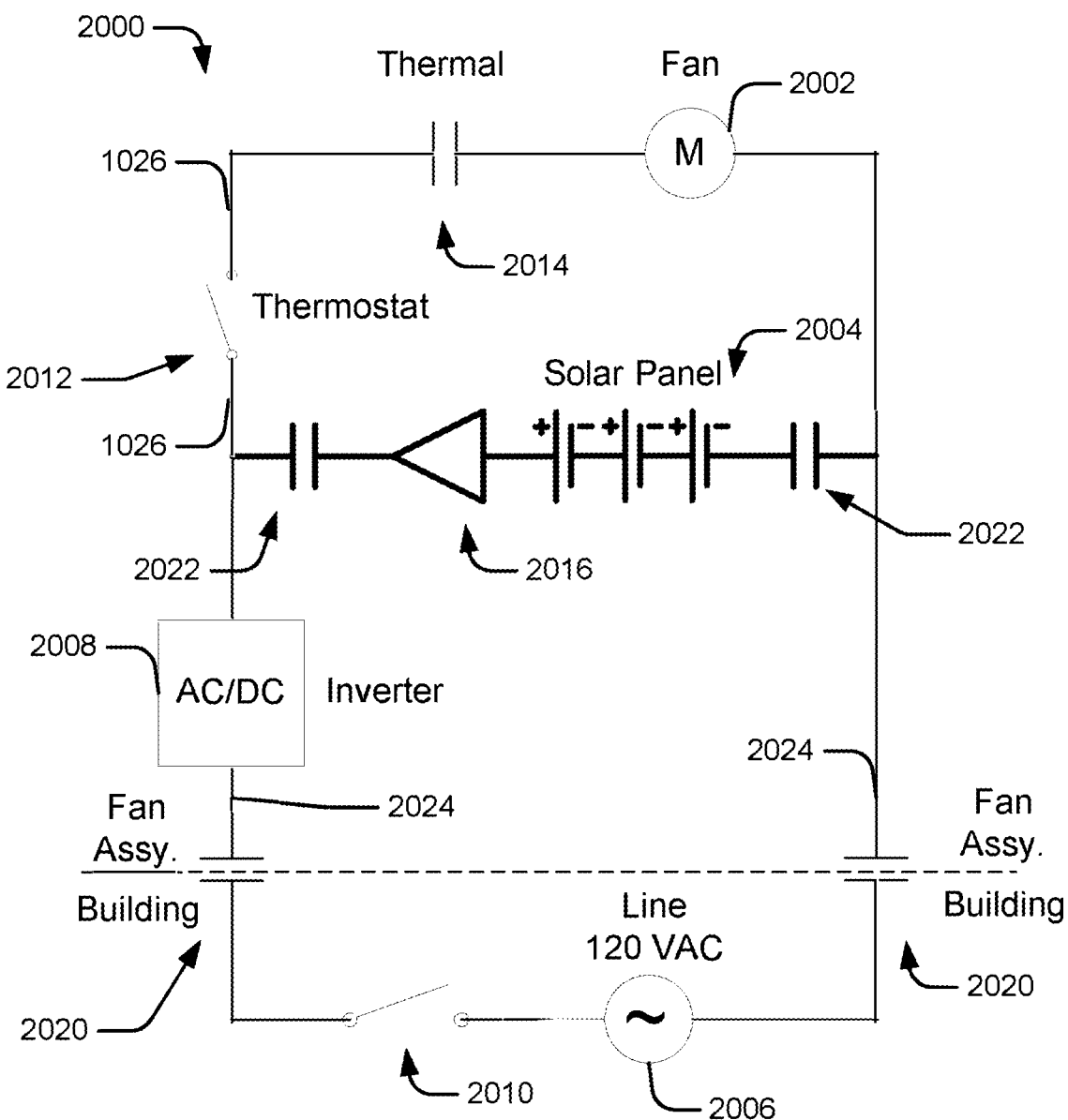
FIG. 20 illustrates a schematic of a circuit associated with a two-piece fan system.

FIG. 20 illustrates a schematic of an exemplary circuit associated with some exemplary ventilation systems according to embodiments of the present invention. More particularly, FIG. 20 illustrates a circuit 2000 which includes a fan motor 2002, a solar panel (or solar cells) 2004, a source of (120 VAC) line power 2006, an inverter 2008, an on/off switch and/or breaker) 2010, a thermostat 2012, a thermal cutoff switch 2014, an isolator 2016, and two pairs of contacts 2020 and 2022, quick disconnects, etc. Generally, the solar panel 2004 and line power 2006 may be wired in parallel across the fan motor 2002 in the exemplary embodiment. Moreover, the contacts 2020 allow those components on the fan assembly to be connected to (and disconnected from) line power 2006 while the contacts 2022 allow the solar panel to be electrically (dis) connected to the fan motor 2002.

Of course, fan systems of embodiments could operate on only one of the solar panel 2004 or line power 2006. In such embodiments, the circuit 2000 can be simplified accordingly. Indeed, where power is only available from the solar panel 2004, the fan motor 2002 will slow down/stop as the light fades thereby allowing natural convection/breezes to ventilate the crawl way 105 during dark periods.

Nonetheless, the inverter 2008 illustrated by FIG. 20 converts the line power 2006 to DC (direct current) power compatible with the fan motor 2002 which can be selected to be driven by DC power from either/both of the solar panel 2004 and/or the inverter 2008 (and, thus, line power 2006). The isolator 2016 can be included in the circuit 2000 so as to protect the solar panel 2004 from being back-driven by that DC power. Moreover, the thermostat 2012 can determine when the fan motor 2002 runs responsive to the temperature sensed by the thermostat 2012 while on/off switch 2010 allows users to control the fan motor 2002 at least as far as line power 2006 might be involved. Of course, if desired, the fan motor 2002 can be instrumented with the thermal cutoff switch 2013 to shut it off if it should overheat.

FIG. 20 also schematically illustrates that the on/off switch 2010 and the source of line power 2006 can be located in/on the building on which the fan system is to be mounted. Meanwhile, the remaining components illustrated by FIG. 20 can be located on the fan assembly (or if desired the base or riser) associated with the circuit 2000. A pair of wires 2024 can run through the fan assembly from the components there on toward the riser/base. These wires 1024 can be routed through the riser/base and thence to some connection point and can terminate in the contacts 2020. In some embodiments, the wires 1024 run external to the fan assembly and can be routed through the building/environment outside of the fan system, fan assembly, riser, base, etc. although they need not be so routed to practice embodiments. Another pair of wires 1026 can be routed through the fan assembly/riser/base so that the thermostat 2012 can be removably (re) located in or near the inlet of the base, riser, fan assembly.

In some embodiments, though, the those wires 1026 further comprise a 36" (or other length) cable allowing the thermostat 2012 to be located at a location with temperatures representative of the crawl way 105. For instance, the area/strata of air near the roof apex is often warmer than the overall crawl way 105. Placing the thermostat 2012 elsewhere (for instance lower) in the crawl way 105 by using the wires 2026 can allow for control of the fan motor 2002 responsive to temperatures more representative of overall conditions in the crawl way 105.

Figure 21:
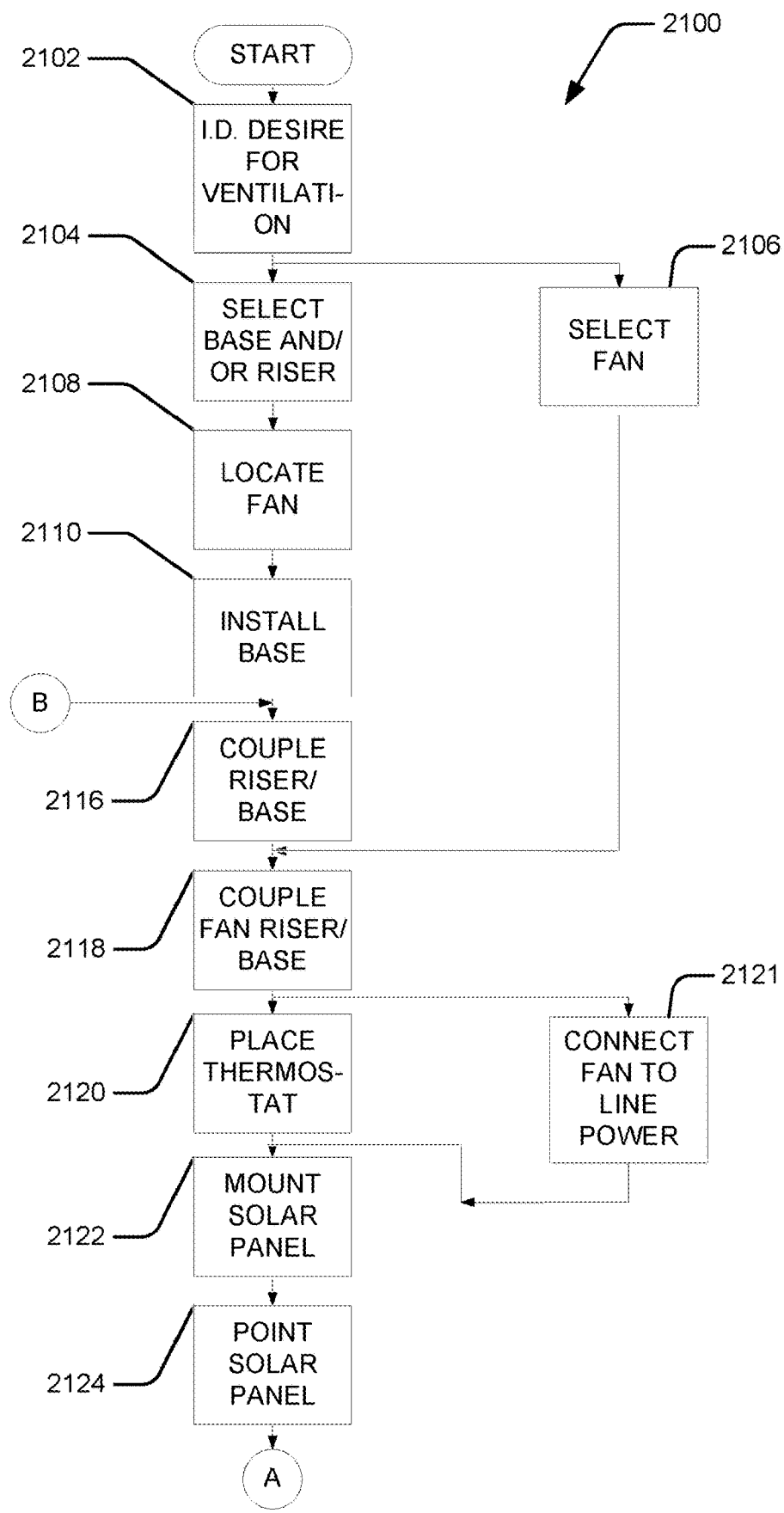
FIG. 21 illustrates a flowchart of a method related to two-piece fan systems.
Figure 21:
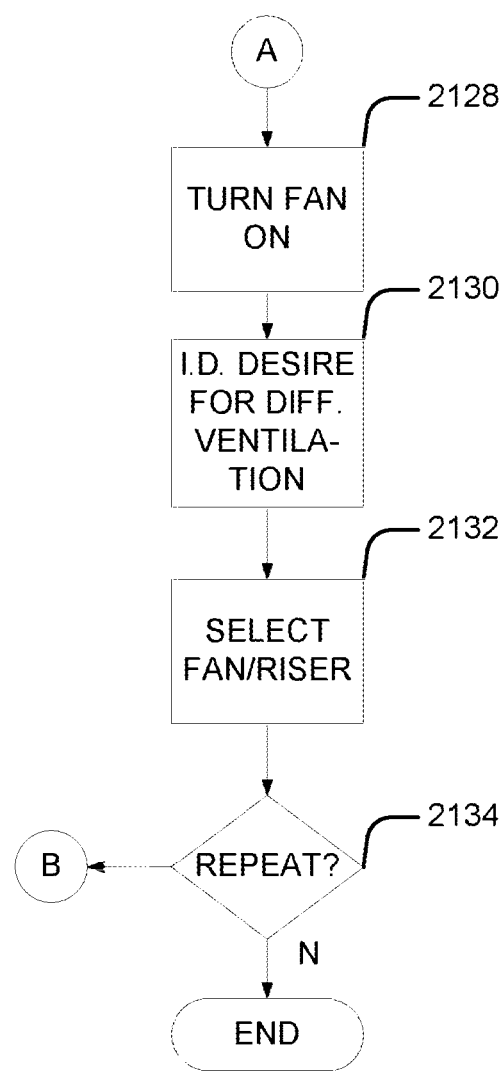

FIG. 21 illustrates a flowchart of a method related to two-piece fan systems. The method 2100 includes numerous activities such as identifying a desire for improved ventilation. See reference 2102. That desire might arise from a user noticing that one or more air-conditioned spaces 103 in a building 100 has been and/or has become warmer than desired. In some cases that desire might arise from a user noticing that a crawl way 105 has become susceptible to mold, mildew, etc. Of course, many circumstances could prompt a user to desire improved ventilation and, indeed, these circumstances might occur in various combinations.

With continuing reference to FIG. 21, one response to such situations is to install (or change) a fan system that ventilates the crawl way 105 of the building 100. Doing so would probably remove warm air from the crawl way 105 and allow warm air from elsewhere to rise to the crawl way 105 where it would also be removed. Such airflow would tend to cool the crawl way 105, the HVAC equipment 106 and/or ducts 108 therein as well as likely reducing the heat load(s) on the air-conditioned spaces 103 of FIG. 1.

Therefore, given the size of the building 100, its air-conditioned spaces 103, the solar insolation in the building's environment, likely weather/climate conditions, the likely occupancy/use of the building, etc. a user can select a fan assembly by size and/or type for use in ventilating the crawl way 105. With heretofore available fan systems, once a user installs the selected fan system, a change or modification to that fan system (or selection thereof) might necessitate a re-engineering/re-design of the installation-site as well as, perhaps, performing again most (if not all) of the installation procedures for the (newly) selected heretofore available fan system. Thus, with such fan systems, changing a selection and/or replacing an existing fan could be comparatively expensive. In contrast, many of these adverse consequences can be avoided with two-piece fan systems of embodiments although doing so is not necessary for the practice of embodiments.

With reference again to FIG. 21, method 2100 can continue with a user selecting various assemblies with which to build/install a two-piece fan system 1300 (FIG. 13) of embodiments. For instance, a user can select a base 1304 by its diameter (or size as pertinent to HVAC considerations), the type of roof 104 it is to be installed on, its shape (for instance, round or rectangular), etc. Moreover, the user can select the base 1304 independently of their selection of the fan assembly 1302. See reference 2104. If desired, the user can select one or more risers 1303 for use with the base 1304. These risers 1303 can be straight, angled, etc. and the user can select more than one riser 1303 if desired. Thus, the user can design a two-piece fan system 1300 while accommodating local concerns such as the possibility that rain, snow, ice, debris, etc. might accumulate on the roof 104 near the fan system 1300.

Method 2100 can continue with the user selecting a fan assembly 1302. The user can base this selection on the size of the fan desired (for instance, desired flow rate, head/pressure, energy consumption, etc.), its type (axial, centrifugal, mixed, etc.), etc. See reference 2106. Again, the user can make the selection of the fan assembly 1302 and base 1304 (and riser) more or less independently of one another provided that they are generally the same size and shape at the joint where they are to be coupled to one another.

At some point, a user can install the base 1304. Installing the base 1304 can be performed at a different time, by different users, with different tools, etc. than the installation of the fan assembly 1302 (and/or riser 1303). Thus, for instance, the installation of the base 1304 could be performed by a user(s) with mechanical/carpentry skills while installation of the fan assembly 1302 could be performed by a user with enough electronic skill to make the electrical connections and/or mechanical skills to install the fan assembly 1302 and/or the solar panel.

The installation of the base 1304 can include various activities. For instance, a user can enter the crawl way 105 (or other space opposite the intended location of the fan system) and mark an appropriate location for the center of the fan system. Often, the user will identify a location between two rafters 324 and mark that location with any convenient writing, marking, etc. tool. The user can then drill a hole through the roof 104 so that the desired location of the fan system becomes apparent from the other side of the roof. The user, moreover, can then access the other side of the roof and use a compass or other tool to mark the outline of the duct-space defined by the base 1304. Using that marking as a guide, the user can then cut through the roof to define the penetration 322 through which air will flow as induced by the fan system. Thus, the user can locate the position of the to-be-installed fan system as indicated at reference 2108.

Further still, the user can lift the roofing material 328 of the roof 102 adjacent to the penetration 322 in preparation for installing the base 1302 and, if desired, apply caulking (or some other sealant) to the roof deck 326 in preparation for sealing the base 1304 to the roof. The user can then, if desired, slide one side of the flashing 1310 under an appropriate portion of the roofing material 328 and then maneuver the base 1302 alone (sans the fan assembly 1302, riser 1303, etc.) into its final place on the roof 104 and/or over the penetration 322. Thus, much of the inconvenience, difficulty, awkwardness, etc. of working with these bulky, heretofore available fan systems can be eliminated. This condition can facilitate the work, reduce associated expenses, and/or reduce the likelihood/severity of mistakes, oversights, etc. Furthermore, the user can use fasteners to fasten the base 1304 to the roof deck 326. See reference 2110.

FIG. 21 also illustrates (at reference 2116) the method of coupling a riser, such as riser 1303 of FIG. 13 to a base, such as the base 1304 of FIG. 13. More particularly, in accordance with embodiments, the user can maneuver the riser 1303 to the vicinity of the base 1304 (after it is installed if desired) and roughly align coupling halves, such as coupling halves 1312 and 1310/1314 of FIG. 13 or coupling halves 1802 and 1804 of FIG. 18, with one another. Once the halves 1802 and 1804 are roughly aligned, the user can engage the male half 1802 and the female half 1804 and then (by maneuvering/twisting the riser 1303) translate one relative to the other thereby causing a latch, such as latch 1820 of FIG. 18, to latch/lock the halves together. Thus, the user can mount the riser 1303 to the base 1304 and do so without tools. Note that at this point that much of the overall two-piece fan system (in terms of physical envelope size) is installed.

In many situations, the fan assembly 1302 (including the fan motor) might be the heavier of the two (or three or more) pieces of the fan system. Thus, at reference 2118, the method shows the user installing a fan assembly, such as fan assembly 1302 of FIG. 13, as a separate piece on the base 1304 and/or riser 1303. Since the user is doing so with only the fan assembly 1302 (and not the base 1304 or riser 1303) in their hands, such activities might be easier, more convenient, less awkward, etc. than would otherwise be the case. Thus, the user can maneuver the fan assembly 1302 into the proximity of the base/riser 130411303 and roughly align corresponding coupling halves, such as coupling halves 1312 and 1310/1314 of FIG. 13 or coupling halves 1802 and 1804. Moreover, the user can then latch the coupling in place with a twist. In the alternative, or in addition, types of couplings other than twist-on/off couplings can be used to couple the various assemblies together. For instance, bayonet fittings could be used. Of course, the user could install the fan assembly 1302 with a riser 1303 attached thereto if desired.

In some embodiments, the user can attend to certain electrical portions of the installation. For instance, the user can place the thermostat 2012 at a location where it can sense temperatures in (or associated with) the crawl way 105. See reference 2120. If the thermostat is a component of the fan assembly 1302, the user might not need to do so though since it could be pre-located in the fan assembly 1302 (or attached thereto) during manufacture. In accordance with embodiments though, the user can connect the connectors 2020 to line power if desired. See reference 2121.

Method 2100 also shows that the user can mount a solar panel to the fan assembly as at reference 2122. If the solar panel 1306 is a separate component of the fan assembly 1302, the user can also connect the connections 2022 (FIG. 13). Additionally, in accordance with embodiments, the user can point the solar panel 1306 toward the sun by adjusting the adjustable brackets 1308 and, perhaps, locking them it in a selected position. Note also that with angled risers, the installation of the angled riser (disclosed elsewhere herein) can include adjusting the orientation of that angled riser to be compatible with obtaining a satisfactory "sun angle" for the solar panel 1306. See reference 2124. FIG. 21 also shows that the user can turn the fan system on as indicated at reference 2128 and/or verify its operation.

At some point, though, it might become desirable to change the fan system. For instance, use of the building, occupancy of the building, heat loads, etc. could change or the user might desire a different fan specifications. See reference 2130. Thus, the user could select another fan assembly 1302 and/or riser(s) 1303. Since the base 1304 is already installed, the user need not select another base 1304 although they could. See reference 2132. Such features allow suppliers of these fan systems to reduce their stocks of fan system parts since they can mix and match fan assemblies, risers, bases, etc. as desired by end users. Moreover, here, the user could then repeat all or portions of method 2100 as indicated at reference 2134. Note that if the interchange of a fan assembly is interrupted for some time, covering the aperture of the riser is generally easier, more convenient than trying to cover a raw penetration through the roof. For instance, a plastic bag can be stretched over the riser to close the aperture as opposed to having to place a tarp over a penetration and some how securing the tarp and excluding runoff from entering the penetration anyway. Of course, if the user is satisfied with the fan system as installed or for other reasons, method 2100 can end.

Figure 22:
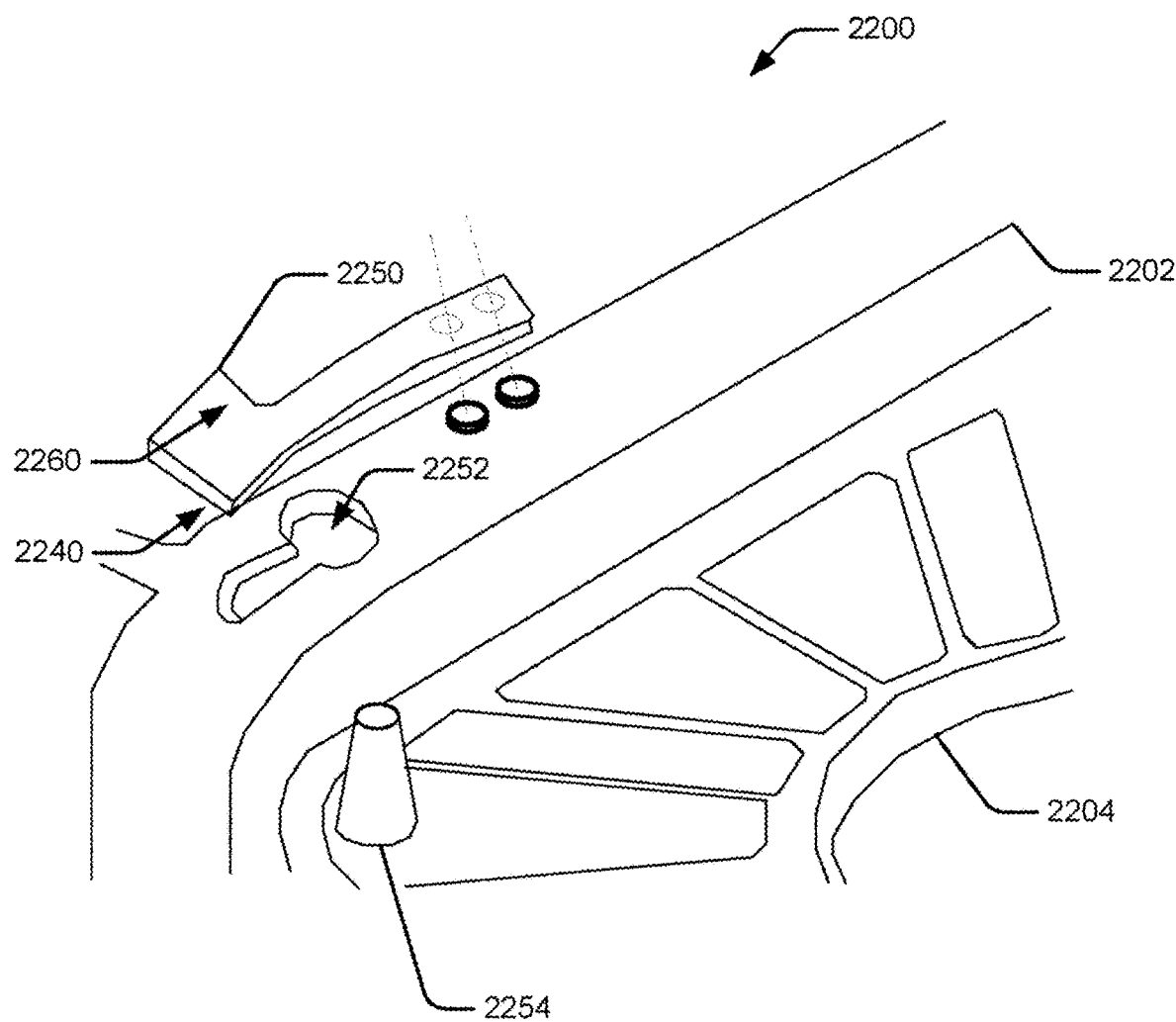
FIG. 22 illustrates a quick attachment coupling for multi-piece fans.

FIG. 22 illustrates a quick attachment coupling for multi-piece fan systems. The multi-piece fan system 200 of the current embodiment comprises two assemblies 2202 and 2204 which can be bases, risers, fan assemblies etc. As FIG. 22 illustrates the multi-piece fan system 2200 includes a quick attachment coupling 2240. In the current embodiment, the quick attachment coupling 2240 includes a flexible detent 2250, catch, dog, pawl, ratchet, etc. and a post 2204 or other protrusion which the flexible detent 2250 can engage. When the two assemblies 2202 and 2204 are mated, the post 2254 (on one assembly 2204) extends through an aperture 2252 defined by the other assembly 2202. The flexible detent 2250 operationally couples with the assembly 2202 which defines the aperture 2252 in the current embodiment. The flexible detent 2250 can be made of metal, plastic, etc.

Moreover, the flexible detent 2250 is positioned relative to the aperture 2252 (and/or the post 2254) such that when the assemblies rotate and/or twist relative to one another, the flexible detent 2250 engages the post and flexes allowing the post 2250 to pass relative to itself. A hook 2260 defined by the flexible detent 2250 can then catch on the post 2254 thereby securing the assemblies 2202 and 2204 to each other. Note that the flexibility of the flexible detent 2250 (and/or shape of the hook 2260) can be selected so that some select amount of torque must be applied (in the opposite direction of rotation) to overcome the detent and free the flexible detent 2250 from the post 2254. In the alternative, or in addition, the quick attachment coupling 2240 can be disengaged, manually, with a tool, etc. by pressing on, pulling, etc. the flexible detent 2250 and/or post 2254.

While certain terms have been used herein which might imply certain directions or orientations, these terms are used merely for the sake of convenience and are non-limiting. For instance, the term "height" is a dimensional term as used herein but does not imply that that dimension necessarily lies along a vertical or even approximately vertical direction. Thus, fans, fan assemblies, risers, bases, etc. of embodiments disclosed herein are not limited to any particular orientation.

Embodiments provide two-piece fan systems with highly efficient solar panels. These solar panels can be monocrystalline and can produce 22 watts at 17.6 VDC/1.22 amps. Fan motors of embodiments can be brushless, high reliability, high efficiency motors capable of operating at 6-100 VDC and in some embodiments (more specifically 12-36 VDC). Moreover, fans of embodiments can include sets of five nylon/polymeric blades. Fans comprising such motors and blades can ventilate areas of 1800 square feet and can induce 1300 CFM (cubic feet per minute) and/or more or less airflow. In some embodiments, the fan assemblies include one AC motor wired to interconnects at which it can receive AC power (for instance 120 VAC) from the building power system and one DC motor wired to interconnects at which it can receive DC power from a solar panel and/or other source.

Housings of embodiments can be made from aluminum, galvanized steel, various plastics such as automotive grade ABS, high-impact resistant plastic, etc. Housings of the current embodiment can also be UV (ultraviolet) stabilized and can include embedded fire retardant resin(s). These housings can also be configured to double lock with their respective (and separate) bases. In embodiments, the double locking can be via keyhole standoffs which guide the two connecting pieces together. A flexible metal pin on one or the other of the mating pieces/assemblies can be configured to snap in place to secure the assemblies together. Because the bases and housings/fan assemblies of embodiments are separate components, installation, support, maintenance, etc. can be easier than with heretofore-available fan systems. In some embodiments, fan assemblies can be about 24" by about 24" by about 7" in size and can weigh about 26 pounds. Bases of the current embodiment can be about 28" by about 28" by about 11." Furthermore, fan systems of embodiments comprise thermal switches and thermoballs (and/or other devices capable of measuring temperature which can regulate the various fan systems disclosed hereon (for instance) 36" cables. Two-piece fan systems of embodiments convert passive ventilation to active ventilation and can extend the life of roofs, AC units, stored valuables, etc. and can reduce moisture and mildew. Two-piece fan systems of embodiments are resistant to even extreme weather and windstorm rated and certified. Such fans reduce HVAC costs and cooling cycles. They also increase air exchanges so that even if solar heat causes temperatures to soar in attics, crawl spaces, and the like, properly balanced fans of embodiments increase air exchanges to as many as ten times per hour. The increased air exchange in accordance with embodiments keeps living spaces cooler and saves building owners money.

Figure 23:
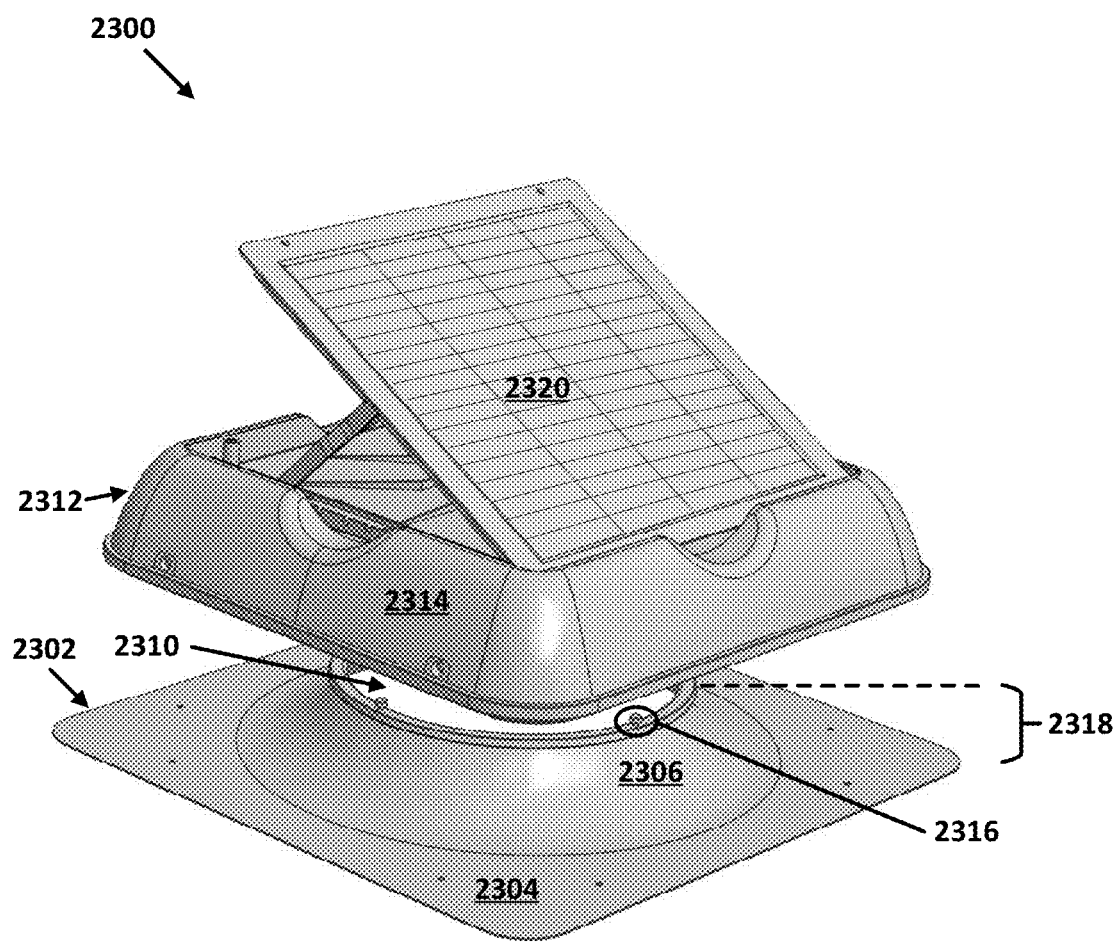
FIG. 23 illustrates a perspective view of an exemplary ventilation system according to embodiments of the present invention.

FIGS. 23-28 illustrate various views of an exemplary ventilation system 2300 according to embodiments of the present invention. The exemplary ventilation system 2300 of FIGS. 23-28 is similar in structure to the two-piece fan systems described with reference to FIGS. 5-20 and FIG. 22. FIG. 23 illustrates a perspective view of an exemplary ventilation system 2300 according to embodiments of the present invention. The exemplary ventilation system 2300 of FIG. 23 includes a base unit 2302 and a fan unit 2312.

The base unit 2302 of FIG. 23 has a mounting platform 2304 for connecting the base unit 2302 to a surface having a surface opening. The surface to which the mounting platform 2304 of FIG. 23 is connected may, for example, be the roof deck 326 of FIG. 3 having a penetration 322. Of course, this is for example only and not for limitation. The exterior surface of any enclosed space may be useful for connecting a mounting platform of a ventilation system according to embodiment of the present invention. For example, the ventilation system 2300 of FIG. 23 may be mounted vertically, for example, to a wall having a hole through which ventilation is desired or mounted to a vertical wall in a horizontal configuration using an 'L' shaped riser adapter.

Even though the mounting platform 2304 of FIG. 23 is depicted as flat in shape, the mounting platform for connecting a base unit according to embodiments of the present invention might vary in shape from one particular surface to another. For example, exemplary mounting platforms useful in embodiments of the present invention may have features or configurations that correspond to various roof features or configurations, thereby permitting such exemplary mounting platforms to mate and/or connect with such roofs. See, for example, the two bases 1706 and 1708 of FIG. 17, which respectively define flashings with corresponding corrugated trapezoidal and sinusoidal cross-sections, and the base 1904 of FIGS. 19 and 19A that define an adaptor 1910 shaped and dimensioned to mate with the roof curb 1906 and to seal thereto.

The base unit 2302 of FIG. 23 also includes a base collar 2306. The base collar 2306 of FIG. 23 extends away from the mounting platform 2304 (and the surface to which the mounting platform 2304 connects) toward the location where the fan unit 2312 connects to the base unit 2302. Because the base collar 2306 of FIG. 23 rises above the plane established by the mounting platform 2304, the base collar 2306 provides a gap region 2318 between the mounting platform 2304 and the fan unit 2312. The gap region 2318 of FIG. 23 keeps the fan unit 2312 above any water runoff from the surface on which the mounting platform 2304 is connected and provides a space into which the fan unit can expel air being ventilated by the exemplary ventilation system 2300. Such a configuration allows for the air outlets of the exemplary fan unit 2312 to be configured on the underside of the fan unit 2312 which helps prevent precipitation such as rain or snow from entering the air outlets.

Figure 24:
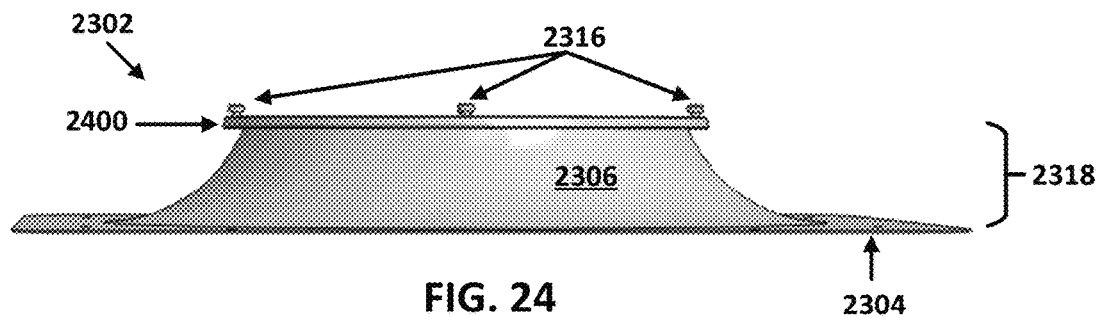
FIG. 24 illustrates a left view of the exemplary base unit useful in ventilation systems according to embodiments of the present invention.
Figure 25A:
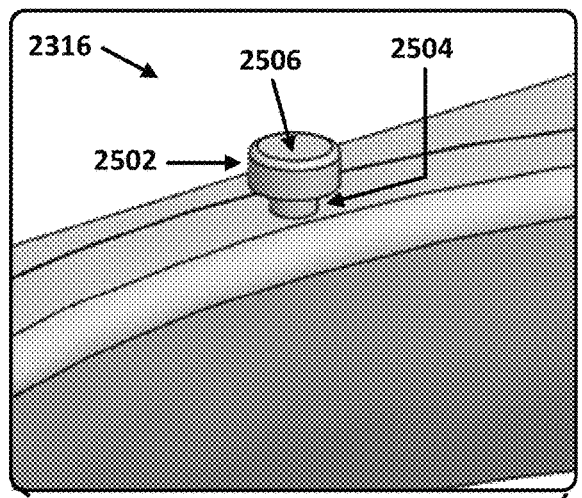
FIG. 25A illustrates a magnified view of an exemplary base feature shown in FIG. 25.
Figure 25:
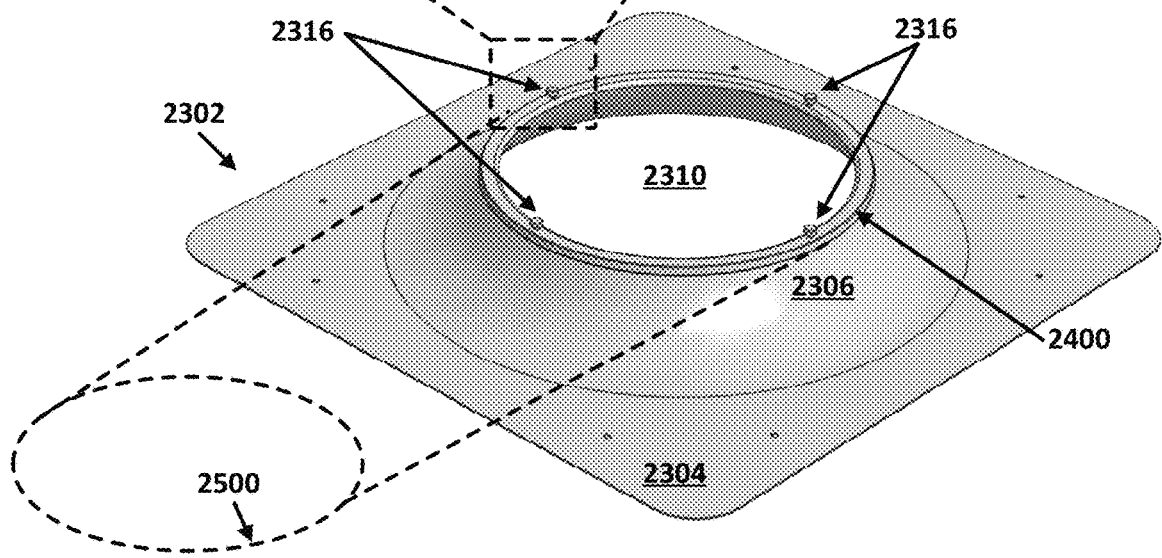
FIG. 25 illustrates a perspective view of the exemplary base unit useful in ventilation systems according to embodiments of the present invention.

For further description of the base collar 2306 and the gap region 2318, FIG. 24 illustrates a left view of the exemplary base unit 2302 useful in ventilation systems according to embodiments of the present invention, and FIG. 25 illustrates a perspective view of the exemplary base unit 2302 useful in ventilation systems according to embodiments of the present invention.

The base collar 2306 of FIGS. 23, 24, 25, and 25A serves to form a perimeter 2500 (shown on FIG. 25) of a base opening 2310 through the base unit 2302 that corresponds to the surface opening through the surface to which the mounting platform 2304 is connected. The base opening 2310 formed by the base collar 2306 of FIG. 23 need not precisely match the size and shape of the opening in the surface to which the exemplary ventilation system 2300 is mounted. The base opening 2310 of FIG. 23 may be smaller or larger than such an opening the surface (e.g., roof).

As shown in FIG. 24, the base collar 2306 includes a flange 2400 around the base collar 2306 at an opposite end of the base collar from the mounting platform 2304. The flange 2400 of FIG. 24 is structured as a flat ring at the top of the base collar 2306. This flange 2400 provides additional structural integrity for the base collar 2306 and provides a platform for connecting to a fan unit such as the fan unit 2312 shown in FIG. 23. As depicted, the space between the flange 2400 and the mounting platform 2304 of FIG. 24 form the gap region 2318.

Figure 26A:
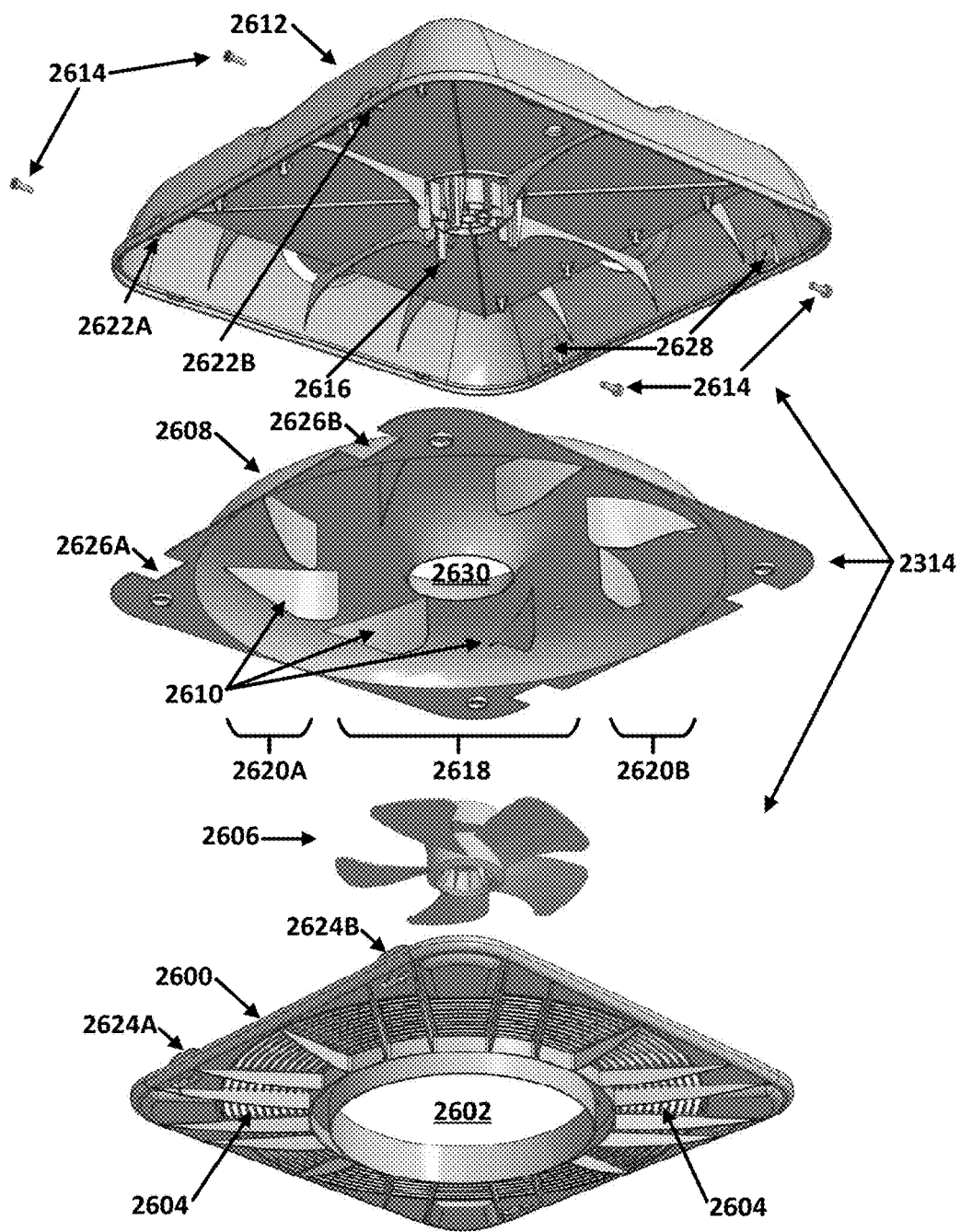
FIG. 26A illustrates an exploded view of the exemplary fan unit shown in FIG. 26.
Figure 26:
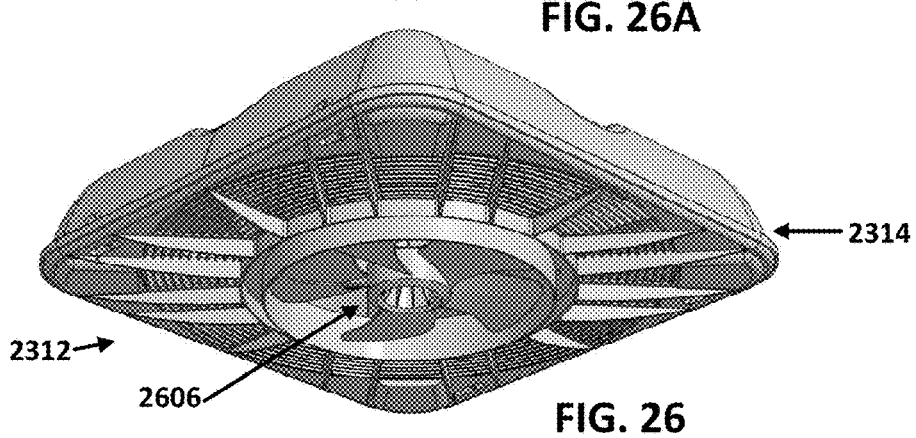
FIG. 26 illustrates a perspective view of the exemplary fan unit useful in ventilation systems according to embodiments of the present invention.

As mentioned, the exemplary ventilation system 2300 of FIGS. 23-28 also includes a fan unit 2312. The exemplary fan unit 2312 is described with reference to FIGS. 23, 26 and 26A. FIG. 26 illustrates a perspective view of the exemplary fan unit 2312 useful in ventilation systems according to embodiments of the present invention. FIG. 26A illustrates an exploded view of the exemplary fan unit 2312 useful in ventilation systems according to embodiments of the present invention.

The exemplary fan unit 2312 of FIG. 23 includes a fan housing 2314 and a fan (2606 in FIGS. 26 and 26A). The fan housing 2314 of FIG. 23 is configured to receive air through an inlet (2602 in FIG. 26A) and expel the air through an outlet (2604 in FIG. 26A). The inlet of the fan housing 2314 in the example of FIG. 23 is configured to correspond to the base opening 2310 so that air passing through the base opening 2310 enters the fan housing 2314 through the air inlet (2602 in FIG. 26A), which in this example is circular in shape as shown in FIGS. 26 and 26A. The outlet of the fan housing 2314 of FIG. 23 is configured as a ring around the inlet 2602 (shown in FIG. 26A). The outlet 2604 discharges the air into the gap region 2318 of FIG. 23 for further dissipation into the surrounding environment.

The exemplary fan housing 2314 of FIGS. 23, 26, and 26A includes a fan housing base 2600, an airflow diverter 2608, and a fan housing cover 2612, all shown in FIG. 26A. In the exemplary embodiment illustrated, the fan housing base 2600, the airflow diverter 2608, and the fan housing cover 2612 are held together with screws 2614. Such attachment is for example only and not for limitation. These components 2600, 2608, and 2612 may be held together via snap attachments, quick-release attachments, or may even be molded together. The fan housing cover 2612 of FIG. 26A provides the structure for connecting other components and protecting the inner components from the weather outside of the fan unit 2312. For example, the fan housing cover 2612 of FIG. 26A includes slots 2622A, 2622B for receiving the connection tabs 2624A, 2624B (also shown on FIG. 28) on the fan housing base 2600 after passing through tab openings 2626A, 2626B of the airflow diverter 2608—effectively sandwiching the airflow diverter 2608 between the fan housing base 2600 and fan housing cover 2612. The same structure exists on the other side of the fan housing cover 2612 where slots 2628 are configured. The fan housing base 2600, the airflow diverter 2608, and the fan housing cover 2612 are held together with screws 2614 that pass through holes in the slots 2622A, 2622B and connection tabs 2624A, 2624B. In addition, the fan housing cover 2600 includes screw receptacles or housings that enable the fan 2606 to be held in place via screws (not shown) that pass through an opening 2630 in the air flow diverter 2608.

Figure 27:
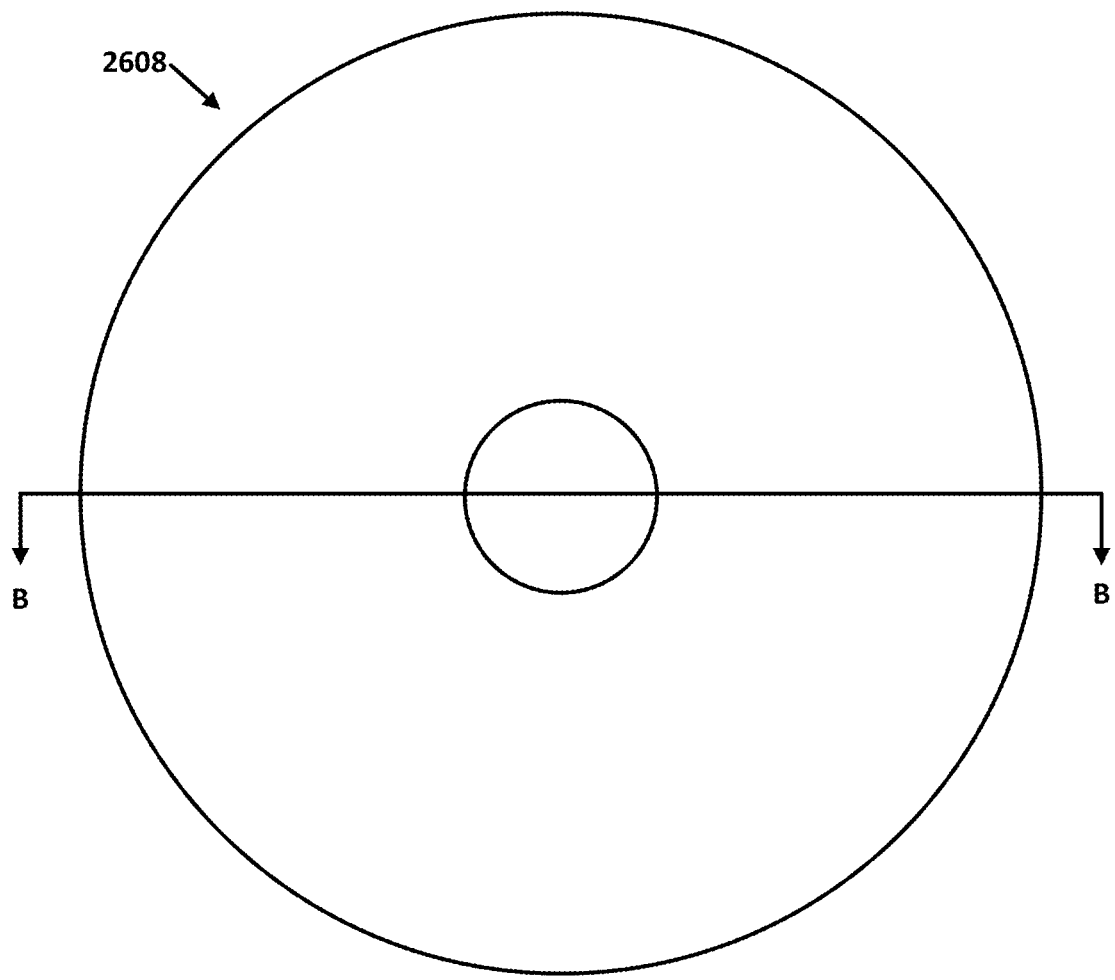
FIG. 27 illustrates a top view of the airflow diverter of FIG. 26A.
Figure 27A:
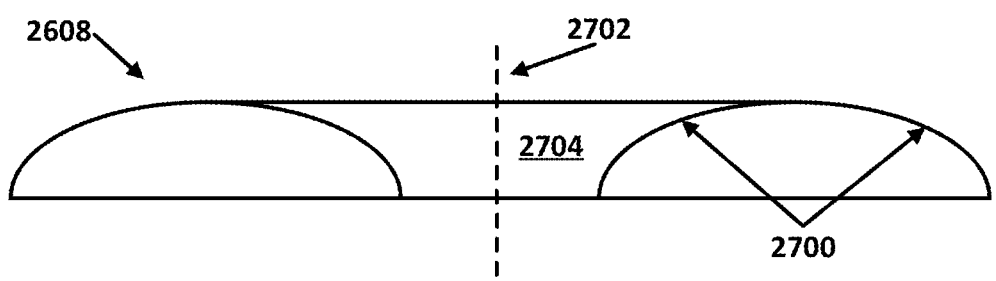
FIG. 27A illustrates a cross-sectional view of the airflow diverter of FIG. 27 along line B-B.

The air flow diverter 2608 of FIG. 26A is formed to guide the air from the inlet 2602 to the outlet 2604. In the exemplary fan unit 2312, the airflow diverter 2608 of FIG. 26A is configured to be ovoidal in shape. The ovoidal shape of the airflow diverter 2608 of FIG. 26A refers to the shape being similar to the 3-dimensional surface generated by rotating an oval curve around an axis. For further explanation, FIG. 27 illustrates a top view of the airflow diverter 2608 of FIG. 26A. FIG. 27A illustrates a cross-sectional view of the airflow diverter 2608 of FIG. 27 along line B-B. In FIG. 27A, an oval curve 2700 is rotated about a vertical axis 2702 to form 3-dimensional surface 2704.

Turning back to FIG. 26A, the airflow diverter 2608 has an inner region 2618 and an outer region 2620A, 2620B. The inner region 2618 of the airflow diverter 2608 is configured adjacent to the inlet 2602 to allow air to flow through the air inlet 2602 into the inner region of the 2618 of the airflow diverter 2608. The inner region 2618 of FIG. 26A is a circular space configured nearest to the center of the airflow diverter 2608. The outer region 2620A, 2620B of FIG. 26A is a ring configured around the inner region 2618 of the airflow diverter 2608. The demarcation between the inner region 2618 and the outer region 2620A, 2620B of FIG. 26A corresponding to the configuration of the inlet 2602 and outlet 2604 formed in the fan housing base 2600.

Air flows into the inner region 2618 as the fan 2606 rotates the fan blades and draws air from outside the fan unit 2312 up through the base opening (2310 on FIG. 23) and further through the inlet 2602 of FIG. 26A. Air moves along the airflow diverter 2608 from the inner region 2618 to the outer region 2620A, 2620B in FIG. 26A as the fan 2606 continues to draw air into the inner region 2618, thereby displacing the air already in the inner region 2618 and forcing the air to move to the outer region 2620A, 2620B of the airflow diverter 2608. The outer region 2620A, 2620B is configured adjacent to the outlet 2604. As air continues to be moved from the inner region 2618 to the outer region 2620A, 2620B, the air that is already present in the outer region 2620A, 2620B is displaced and expelled through the air outlet 2604 into the gap region 2318 (shown on FIG. 23) for dissipation into the surrounding environment.

In the example of FIG. 26A, the airflow diverter 2608 includes various vanes 2610 for directing the air from the inlet 2602 to the outlet 2604. This prevents air from just circulating around and around the outer region 2620A, 2620B of the airflow diverter 2608 and forces air through the outlet 2604. The vanes 2610 of FIG. 26A increase the overall efficiency of the fan 2606 moving air through the inlet 2602 and subsequently expelling that air through the outlet 2604, which has the advantage of saving power in the exemplary system.

One of skill in the art will recognize that other configurations of an airflow diverter and placement of the inlet and outlet may be useful in embodiments of the present invention. Factors that may effect the configurations of an airflow diverter and placement of an inlet and outlet in such other embodiments may include the overall orientation of the ventilation system so as to avoid precipitation entering the system, the shape of the fan housing cover or overall shape of the ventilation system for a particular application, the size of the fan required to ventilate a particular area, and other such factors as will occur to those of skill in the art.

The fan housing 2314 as shown in FIGS. 26 and 26A provides the structure for configuring the fan (2606 of FIGS. 26 and 26A) inside the fan unit 2312. The fan blades of the exemplary fan (2606 in FIGS. 26 and 26A) inside the fan housing 2314 are configured to fit inside and operate within the air inlet 2602. For optimal efficiency at moving air, the fan blades are sized to cover the entire area of the air inlet 2602 without touch the sides of the inlet 2602. The motor of the fan (2606 in FIGS. 26 and 26A) and the opening 2630 in the air flow diverter 2608 are configured to be similar in size such that the fan motor fits inside the opening 2630 of the air flow diverter 2608. Such a configuration increases the efficiency of the airflow diverter 2608 and fan 2606 at moving the air from the inlet 2602 to the outlet 2604 because less air gets trapped in the region between the fan motor and the opening 2630 of the air flow diverter 2608 if the fan motor and the opening 2630 are similar in size. In the example of FIGS. 26 and 26A, allowing the fan motor to be tucked inside the opening 2630 allows the overall height of the fan unit to be less, thereby promoting a lower profile ventilation system that is subject to less wind shear forces than a fan unit with a larger height.

The fan (2606 in FIGS. 26 and 26A) inside the fan housing 2314 of FIG. 23 is capable of connecting to a power source that enables the fan to move the air from the inlet to the outlet. In the example of FIG. 23, the power source is solar power provided by solar cells of solar panels 2320 mounted to the top of the fan housing 2314. The solar panels 2320 of FIG. 23 are electrically connected to the fan (2606 in FIGS. 26 and 26A) using various electrical conductors. A thermostat connected in series with the solar power source, which includes the solar panels 2320 of FIG. 23, and the fan (2606 in FIGS. 26 and 26A) may control when the fan is activated and/or deactivated by turning on and/or turning off power to the exemplary fan. Of course, other types of power sources may also be utilized in ventilation systems according to embodiments of the present invention such as, for example, A/C power sources, D/C power sources (e.g., battery power sources), mechanical power sources (e.g., wind turbine).

Figure 28:
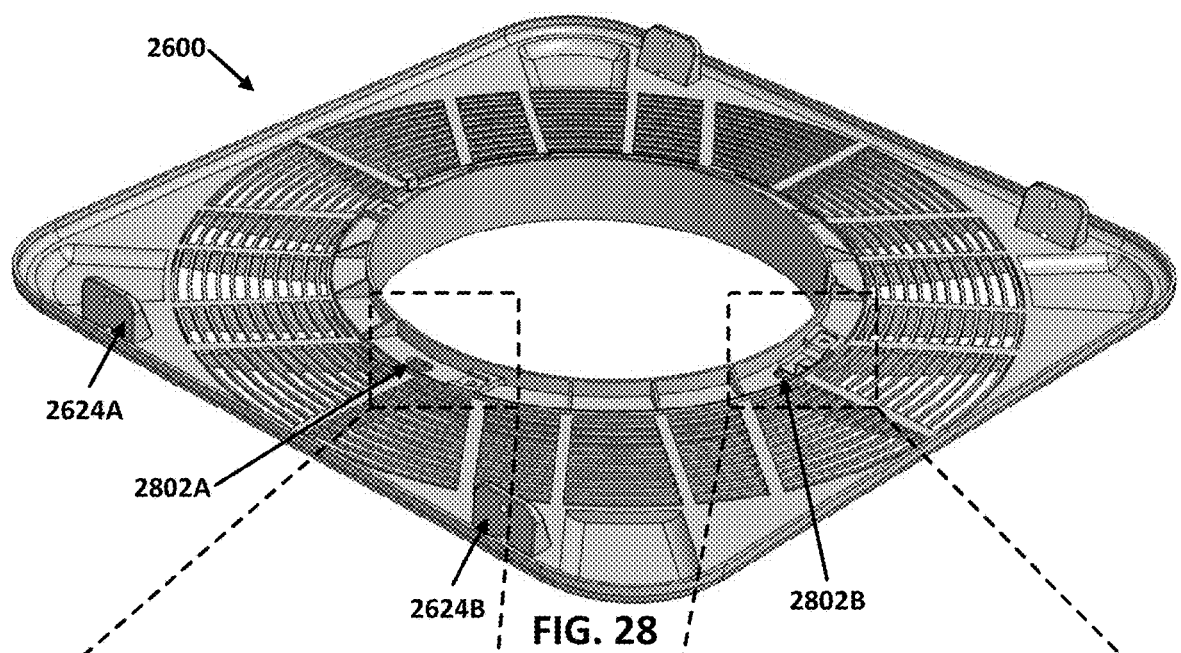
FIG. 28 illustrates a perspective view of the exemplary fan housing base of a fan unit useful in ventilation systems according to embodiments of the present invention.
Figure 28A:
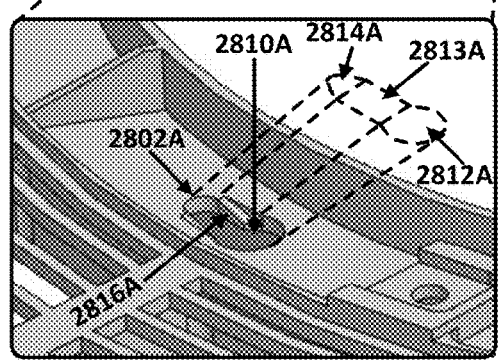
FIG. 28A illustrates a magnified view of the exemplary fan housing feature of FIG. 28.
Figure 28B:
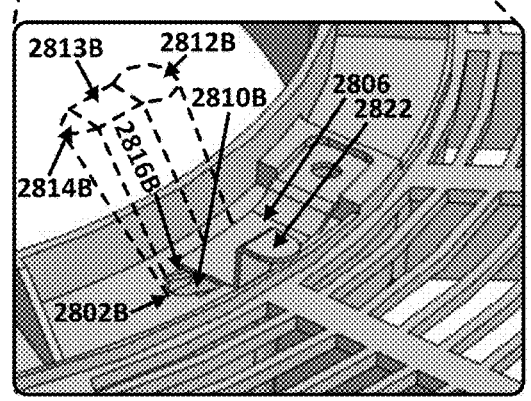
FIG. 28B illustrates another magnified view of the exemplary fan housing feature of FIG. 28.
Figure 28C:
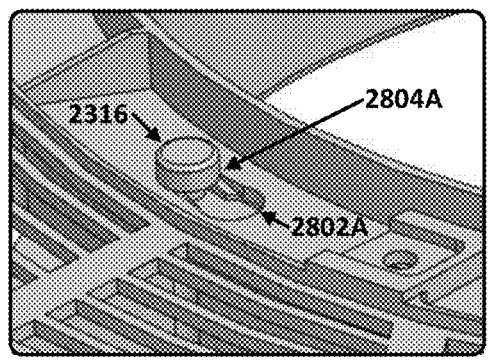
FIG. 28C illustrates a magnified view of the exemplary fan housing feature of FIG. 28 coupled together with an exemplary base feature according to embodiments of the present invention.
Figure 28D:
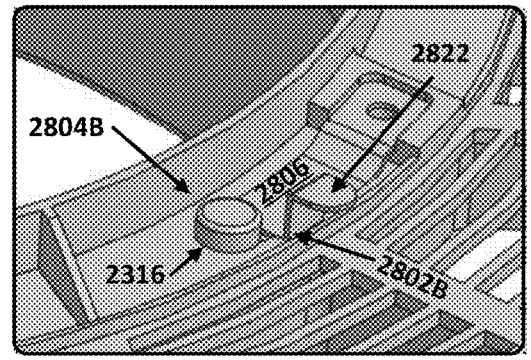
FIG. 28D illustrates another magnified view of the exemplary fan housing feature of FIG. 28 coupled together with an exemplary base feature according to embodiments of the present invention.

The exemplary ventilation system 2300 of FIGS. 23-28 also includes quick connect interfaces (2804A, 2804B in FIGS. 28C and 28D). Each quick connect interface 2804A, 2804B of FIGS. 28C and 28D consists of a pair of interlocking parts can be coupled and decoupled by moving the interlocking parts relative to one another. The term 'quick connect' describes the joinder or dis-joinder of at least two components by hand without the aid of additional tools. In the example of FIGS. 28C and 28D, each of the exemplary quick connect interfaces 2804A, 2804B consist of a base feature 2316 integrated into the base unit 2302 and a fan housing feature (2802A, 2802B shown in FIGS. 28 and 28A-D) that is integrated into the fan unit 2302. The base feature 2316 and the fan housing feature 2802A, 2802B are capable of detachably connecting together to secure the fan unit 2312 to the base unit 2302.

FIG. 25A is a magnified view of an exemplary base feature 2316 shown in FIG. 25. The exemplary base features 2316 shown in FIGS. 23-25, 28C, and 28D are mounted to the base collar 2306. More specifically, the base features 2316 are mounted to the flange (2400 on FIG. 24) of the base collar 2306. Each base feature 2316 of FIGS. 23-25, 28C, and 28D is implemented as a detent 2506 that extends out from the base collar 2306 away from the mounting platform 2304. The detent 2506 of FIG. 25A serves as a catch that prevents motion until released in the exemplary quick connect interfaces illustrated with reference to the Figures. In the example of FIG. 25A, the detent 2506 includes a detent head 2502 and a detent body 2504. The detent head 2502 of FIG. 25A is larger than the detent body 2504. This size differential operates to allow the base feature 2316 to lock into place with the corresponding feature of the quick connect interface on the fan unit 2312.

The corresponding features to the base features 2316 on the exemplary fan unit 2312 of the quick connect interfaces 2804A, 2804B (shown on FIGS. 28C and 28D are the fan housing features 2802A, 2802B (shown on FIGS. 28 and 28A-D). The fan housing features 2802A, 2802B of the quick connect interfaces 2804A, 2804B are integrated into the fan housing base 2600. Each fan housing feature 2802A, 2802B consists of a receptacle 2810A, 2810B capable of receiving a corresponding base feature 2316 of the quick connect interface 2804A, 2804B. FIGS. 28A-B depict the receptacles 2810A, 2810B ready to receive the base features 2316. FIGS. 28C-D depict the base features 2316 engaged and locked into place in the receptacles 2810A, 2810B. The receptacles 2810A, 2810B form holes through the fan housing base 2600. The configuration of the holes formed by the receptacles 2810A, 2810B and the configuration of the base features 2316 prescribed how the two component interact to couple and decouple the base unit 2302 and the fan unit 2312.

Each receptacle 2810A, 2810B of FIGS. 28A-B defines an entry region 2812A, 2812B, a transition region 2813A, 2813B, and a locking region 2814A, 2814B. These regions are shown on FIGS. 28A-B using dotted lines for clarity and to avoid cluttering. Each entry region 2812A, 2812B is capable of receiving the base feature 2316. As such, each entry region 2812A, 2812B must be at least as large as the detent head of the base feature 2316. Each locking region 2814A, 2814B is capable of securing the base feature 2316 in the receptacle 2810A, 2810B. As such, each locking region 2814A, 2814B of FIGS. 28A-B should be configured smaller than the detent head of the base feature 2316 but larger than the detent body of the base feature 2316. As shown in FIGS. 28C-D, the detent heads of the base features 2316 being larger than the locking regions 2814A, 2814B prevents the base features 2316 from being pulled back through the receptacles 2810A, 2810B without rotating the base features 2316 out of the locking regions 2814A, 2814B. As one of skill in the art can appreciate, the thickness of the receptacles 2810A, 2810B affect the minimum length of the detent body of the base features 2316. The thicker the fan housing base 2600 forming the receptacles 2810A, 2810B, the longer the detent bodies of the base features 2316 need to be.

Each transition region 2813A, 2813B is capable of guiding the base feature 2316 from entry region 2812A, 2812B to the locking region 2814A, 2814B. To assist with guiding the base feature 2316 from entry regions 2812A, 2812B to the locking regions 2814A, 2814B, each transition region 2813A, 2813B provides an incline 2816A, 2816B that guides the base feature 2316 into the locking region 2814A, 2814B. Each incline 2816A, 2816B of FIGS. 28A-B is oriented to pull the base unit 2302 and the fan unit 2312 together as the base feature 2316 moves into the locking region 2814A, 2814B.

In the example of FIGS. 28B, 28D, the fan housing feature 2802B includes a catch 2806 that is implemented as a flat spring with finger tab 2822. The catch 2806 of FIGS. 28B, 28D is configured to prevent the base feature 2316 from backing out of the locking region 2814A, 2814B after passing a predetermined position. The predetermined position is set by the size of the detent head and the length of the catch 2806. As the detent head is received into the entry region 2812B, the catch 2806 is forced upward to make room for the detent head to protrude through the receptacle 2810B. The detent head of the base feature 2316 slides upward along the incline 2816B into the locking region 2814B as the fan unit 2312 and the base unit 2302 are rotate relative to one another. Upon entering the locking region 2814B, the detent head of the base feature 2316 clears the end of the catch 2806. The spring loaded catch 2806, having been under tension from the detent head of the base feature 2316 forcing the catch 2806 upward, then snaps down and holds the base feature 2316 in place in the locking region 2814B as shown in FIG. 28D. When an operator is ready to decouple the base unit 2302 from the fan unit 2312, the operator merely lift up on the finger tab 2822 so that the catch 2806 is raised above the detent head of the base feature 2316 and then rotates the fan unit 2312 and the base unit 2302 relative to one another in the direction opposite from when the fan unit 2312 and the base unit 2302 were coupled.

Figure 29:
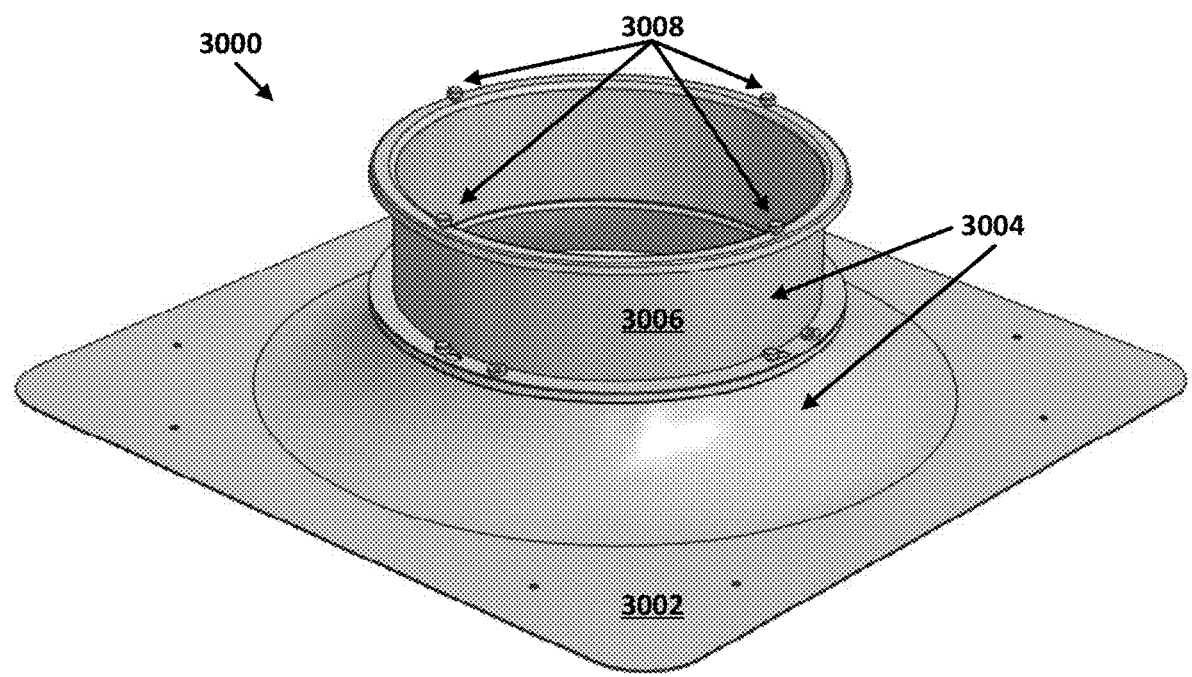
FIG. 29 sets forth a perspective view of a base unit useful in ventilation systems according to embodiments of the present invention.
Figure 30:
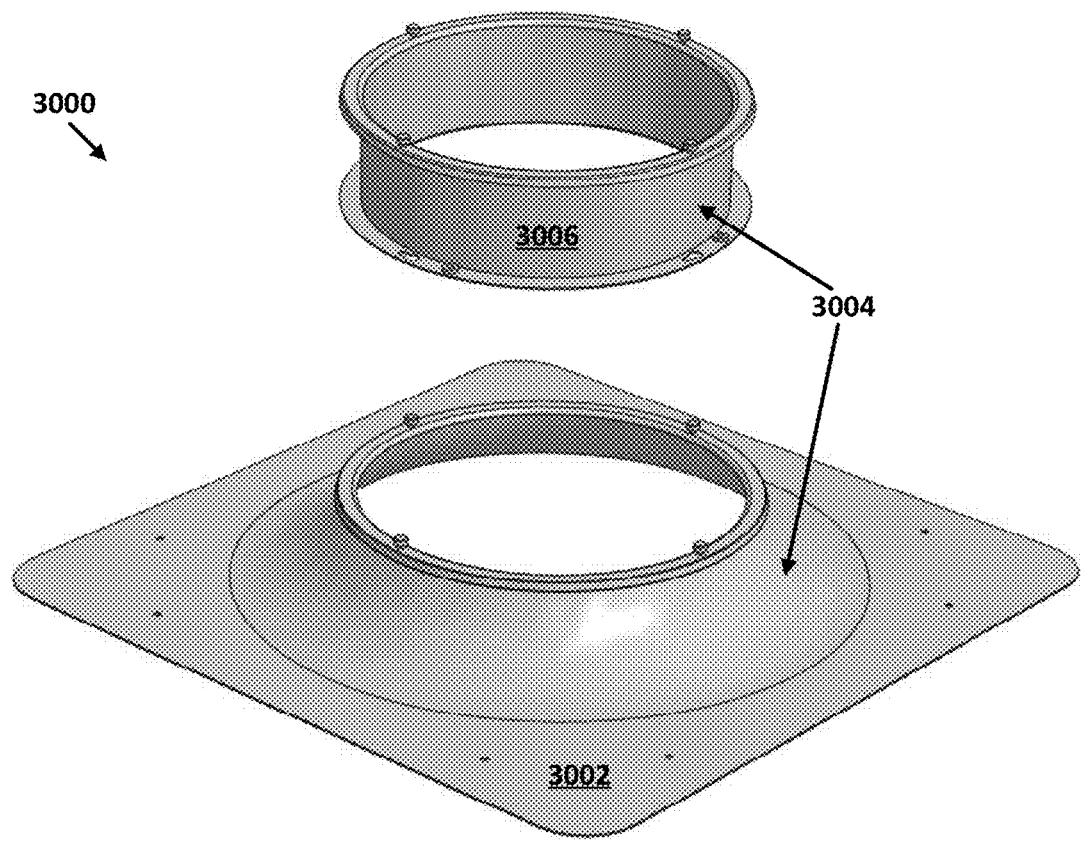
FIG. 30 sets forth an exploded view of a base unit depicted in FIG. 29.

As mentioned above, in some applications, raising a fan unit higher might provide advantages. Accordingly, some base units useful in ventilation systems according to embodiments of the present invention, may include a riser. FIG. 29 sets forth a perspective view of a base unit 3000 useful in ventilation systems according to embodiments of the present invention. FIG. 30 sets forth an exploded view of a base unit 3000 depicted in FIG. 29. The base unit 3000 of FIGS. 29 and 30 includes a mounting platform 3002 and a base collar 3004, all structured similar to the base unit 2302 described with reference FIGS. 23-25. The base collar 3004 of FIGS. 29 and 30, however, also includes a detachable riser 3006. The riser 3006 connects to the rest of the base collar 3004 in FIGS. 29 and 30 using quick connect couplings similar to the manner in which the fan unit 3212 of FIG. 23 connects to the base collar 2306 and described with reference to FIGS. 28 and 28A-D. In turn, an exemplary fan unit may attach to the riser 3006 in the same manner as the fan unit 3212 of FIG. 23 connects to the base collar 2306. This is accomplished because the base features 3008 of FIG. 29 are mounted to the detachable riser 3006 in the same manner that that the base features 2316 are mounted to the base collar 2306 in FIGS. 23-25. That is, the base features 3008 are detents having a detent body and detent head that protrude from the riser 3006 away from the mounting platform 3002.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A ventilation system comprising:
   a base unit having a mounting platform for connecting the base unit to a surface having a surface opening, the base unit having a base collar extending away from the mounting platform, the base collar forming a perimeter of a base opening through the base unit that corresponds to the surface opening;
   a fan unit comprising a fan housing and a fan, the fan housing configured to receive air through an inlet and expel the air through an outlet, the fan capable of connecting to a power source that enables the fan to move the air from the inlet to the outlet, wherein the fan housing further comprises a fan housing base;
   a quick connect interface having a base feature and a fan housing feature, the base feature integrated into the base unit, the fan housing feature integrated into the fan unit, the base feature and the fan housing feature capable of detachably connecting together to secure the fan unit to the base unit, wherein the fan housing feature of the quick connect interface is integrated into the fan housing base.

2. The ventilation system of claim 1 wherein:
   the fan unit further comprises one or more solar cells mounted on top of the fan housing and electrically connected to the fan; and
   the power source further comprises the one or more solar cells.

3. The ventilation system of claim 1 wherein the base feature is mounted to the base collar.

4. The ventilation system of claim 3 wherein:
   the base collar further comprises a flange around the base collar at an opposite end of the base collar from the mounting platform; and
   the base feature is mounted to the flange.

5. The ventilation system of claim 1 wherein the base feature further comprises a detent extending from the base collar away from the mounting platform.

6. The ventilation system of claim 5 wherein the detent further comprises a detent body and a detent head, the detent head being larger than the detent body.

7. The ventilation system of claim 1 wherein the base collar of the base unit further comprises a detachable riser.

8. The ventilation system of claim 7 wherein the base feature is mounted to the detachable riser.

9. The ventilation system of claim 1 wherein the fan housing further comprises an airflow diverter for guiding the air from the inlet to the outlet, the airflow diverter configured to be ovoidal in shape, the airflow diverter further comprises an inner region and an outer region, the inner region configured adjacent to the inlet, the outer region configured adjacent to the outlet.

10. The ventilation system of claim 9 wherein the airflow diverter further comprises one or more vanes for directing the air from the inlet to the outlet.

11. The ventilation system of claim 1 wherein the fan housing feature of the quick connect interface further comprises a receptacle capable of receiving the base feature of the quick connect interface.

12. The ventilation system of claim 11 wherein the receptacle defines an entry region, a transition region, and a locking region, the entry region capable of receiving the base feature, the transition region capable of guiding the base feature from entry region to the locking region, and the locking region capable of securing the base feature in the receptacle.

13. The ventilation system of claim 12 wherein the fan housing feature of the quick connect interface further comprises a catch configured to prevent the base feature from backing out of the locking region after passing a predetermined position.

14. The ventilation system of claim 12 wherein the transition region further comprises an incline that guides the base feature into the locking region.

15. The ventilation system of claim 14 wherein the incline is oriented to pull the base unit and the fan unit together as the base feature moves into the locked region.

\* \* \* \* \*